(12) United States Patent
Nuno

(10) Patent No.: US 7,832,945 B2
(45) Date of Patent: Nov. 16, 2010

(54) LENS BARREL, CAMERA AND PORTABLE INFORMATION TERMINAL APPARATUS

(75) Inventor: Katsuhiko Nuno, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 782 days.

(21) Appl. No.: 11/572,685

(22) PCT Filed: Jul. 26, 2005

(86) PCT No.: PCT/JP2005/014002

§ 371 (c)(1),
(2), (4) Date: Jul. 25, 2007

(87) PCT Pub. No.: WO2006/011621

PCT Pub. Date: Feb. 2, 2006

(65) Prior Publication Data

US 2008/0019681 A1 Jan. 24, 2008

(30) Foreign Application Priority Data

Jul. 26, 2004 (JP) ............................. 2004-217924

(51) Int. Cl.
*G03B 17/04* (2006.01)
(52) U.S. Cl. .................................................. 396/349
(58) Field of Classification Search ............. 396/73–75, 396/87, 348–350
See application file for complete search history.

(56) References Cited

U.S. PATENT DOCUMENTS

| | | | |
|---|---|---|---|
| 5,765,049 | A | 6/1998 | Hase et al. |
| 6,575,642 | B2 * | 6/2003 | Nozawa et al. ............. 396/349 |
| 2003/0156832 | A1 | 8/2003 | Nomura et al. |
| 2004/0042090 | A1 | 3/2004 | Nomura |
| 2005/0036777 | A1 * | 2/2005 | Nomura et al. ............. 396/73 |
| 2006/0017836 | A1 | 1/2006 | Nuno |
| 2006/0018039 | A1 | 1/2006 | Nuno |

(Continued)

FOREIGN PATENT DOCUMENTS

JP 10 197775 7/1998

(Continued)

OTHER PUBLICATIONS

U.S. Appl. No. 11/567,458, filed Dec. 6, 2006, Nuno.

(Continued)

*Primary Examiner*—W. B. Perkey
(74) *Attorney, Agent, or Firm*—Oblon, Spivak, McClelland, Maier & Neustadt, L.L.P.

(57) ABSTRACT

A lens barrel includes a telescopic cylinder, at least one movable lens, and a retractable lens. The telescopic cylinder includes at least one movable cylinder that can be accommodated in a fixed cylinder. The movable lens is retained in the movable cylinder. An optical axis of the movable lens determines a reference axis of the lens barrel. The retractable lens can be retracted in a plane perpendicular to the reference axis from a photographing position on the reference axis to a retracted position off the reference axis. In a photographing state, the retractable lens is adjacent to the movable lens, and the movable lens and the retractable lens are coaxially aligned along the reference axis. The retractable lens moves to the reference axis from the retracted position immediately after the movable cylinder of the movable lens reaches a maximum protruded position.

23 Claims, 31 Drawing Sheets

U.S. PATENT DOCUMENTS

2006/0018654 A1  1/2006  Nuno et al.

FOREIGN PATENT DOCUMENTS

| JP | 2003 121912 | 4/2003 |
| JP | 2003 149723 | 5/2003 |
| JP | 2003 315861 | 11/2003 |
| JP | 2004 117399 | 4/2004 |
| JP | 2004 117400 | 4/2004 |
| JP | 2004 117401 | 4/2004 |
| JP | 2004 117402 | 4/2004 |

OTHER PUBLICATIONS

U.S. Appl. No. 11/572,750, filed Jan. 26, 2007, Nuno, et al.

* cited by examiner

FIG.24A1
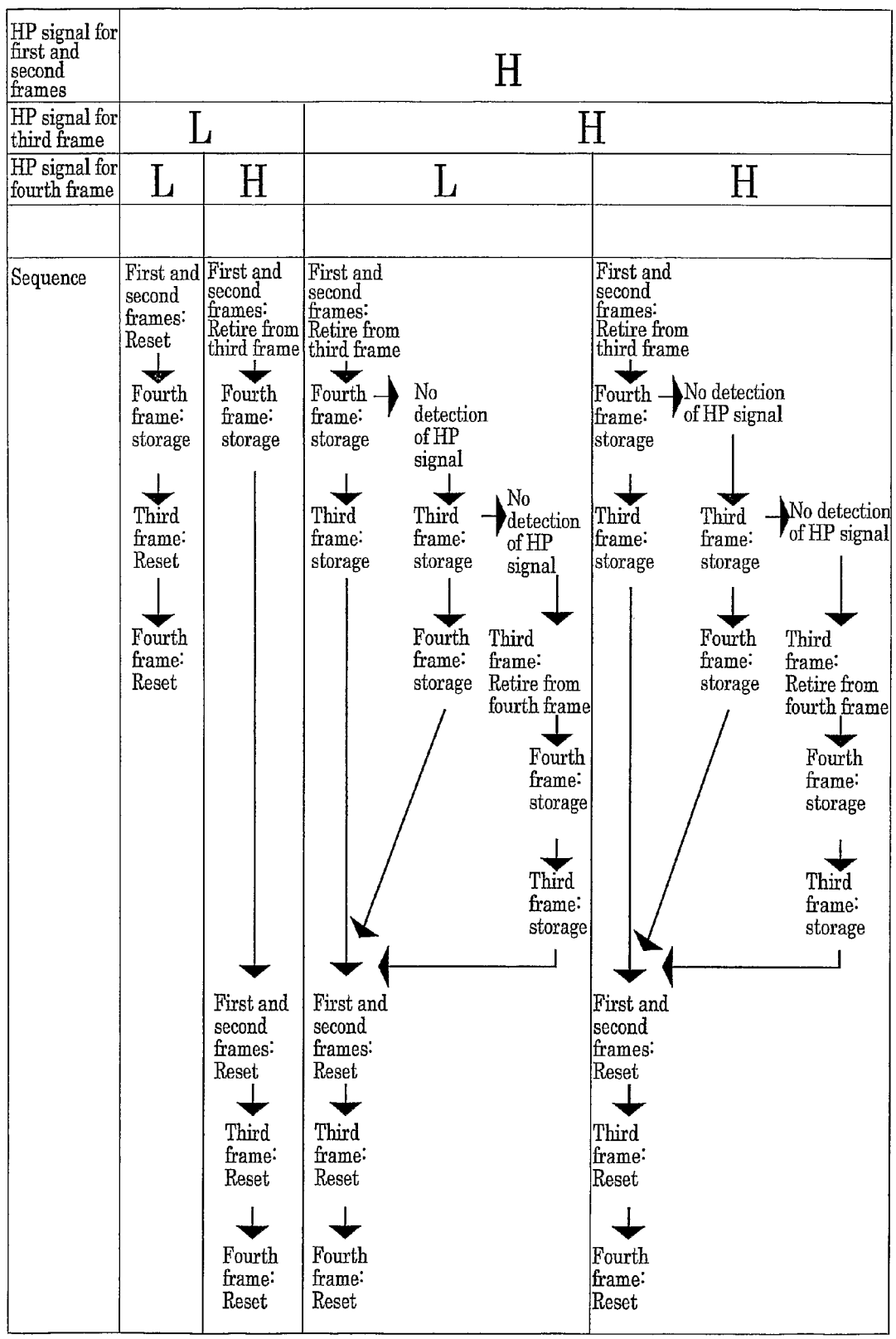

FIG.24A2
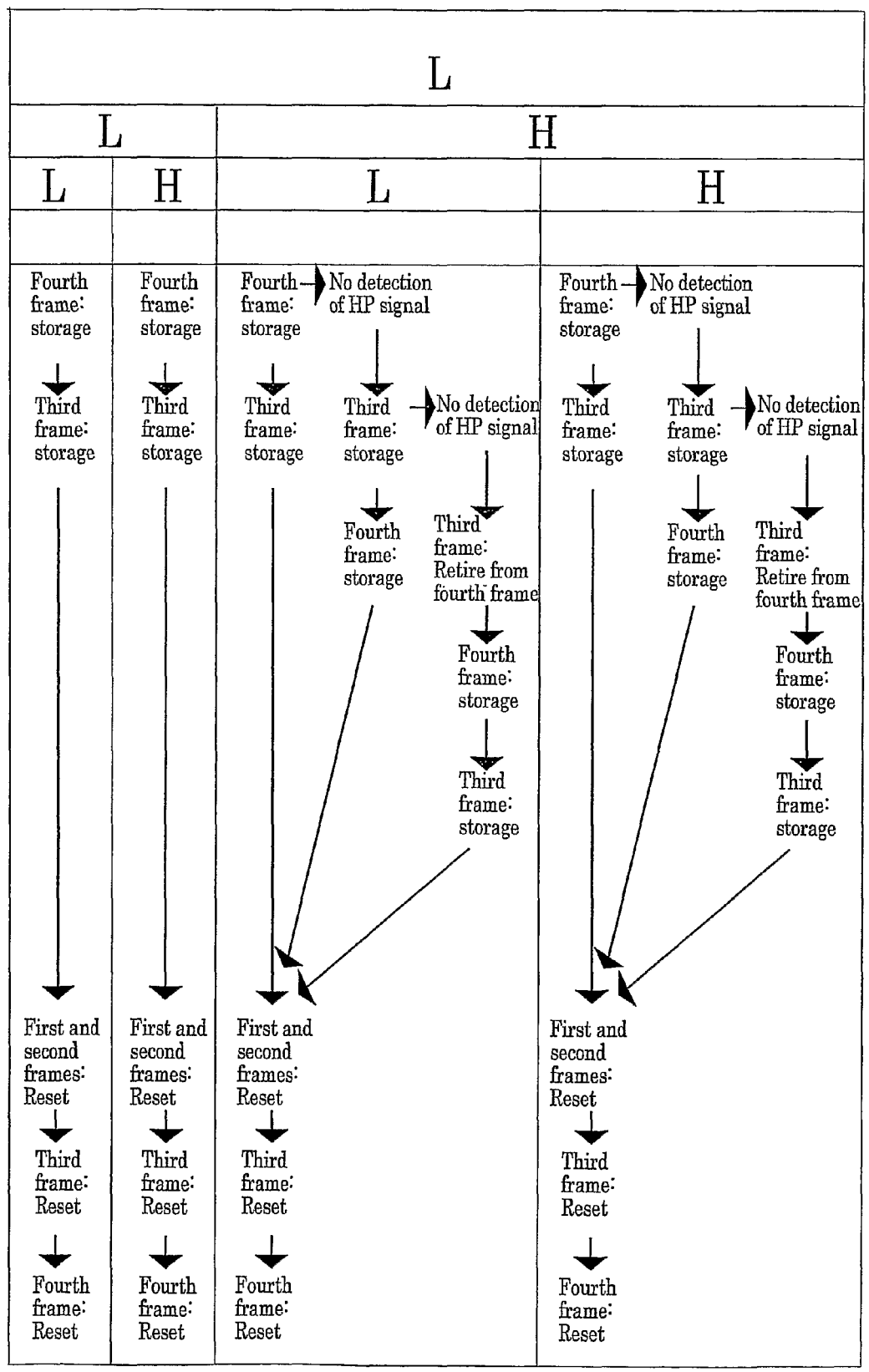

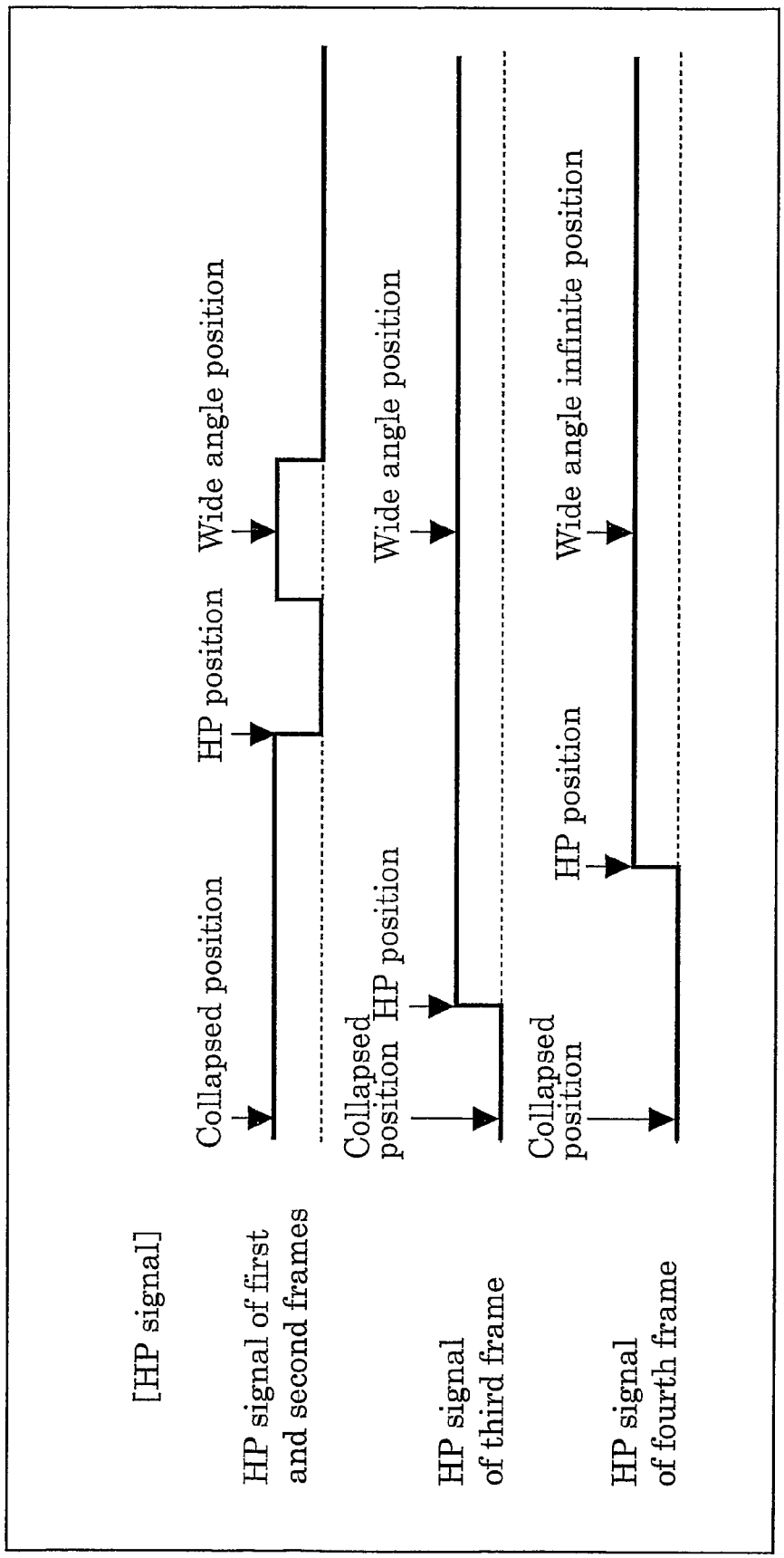

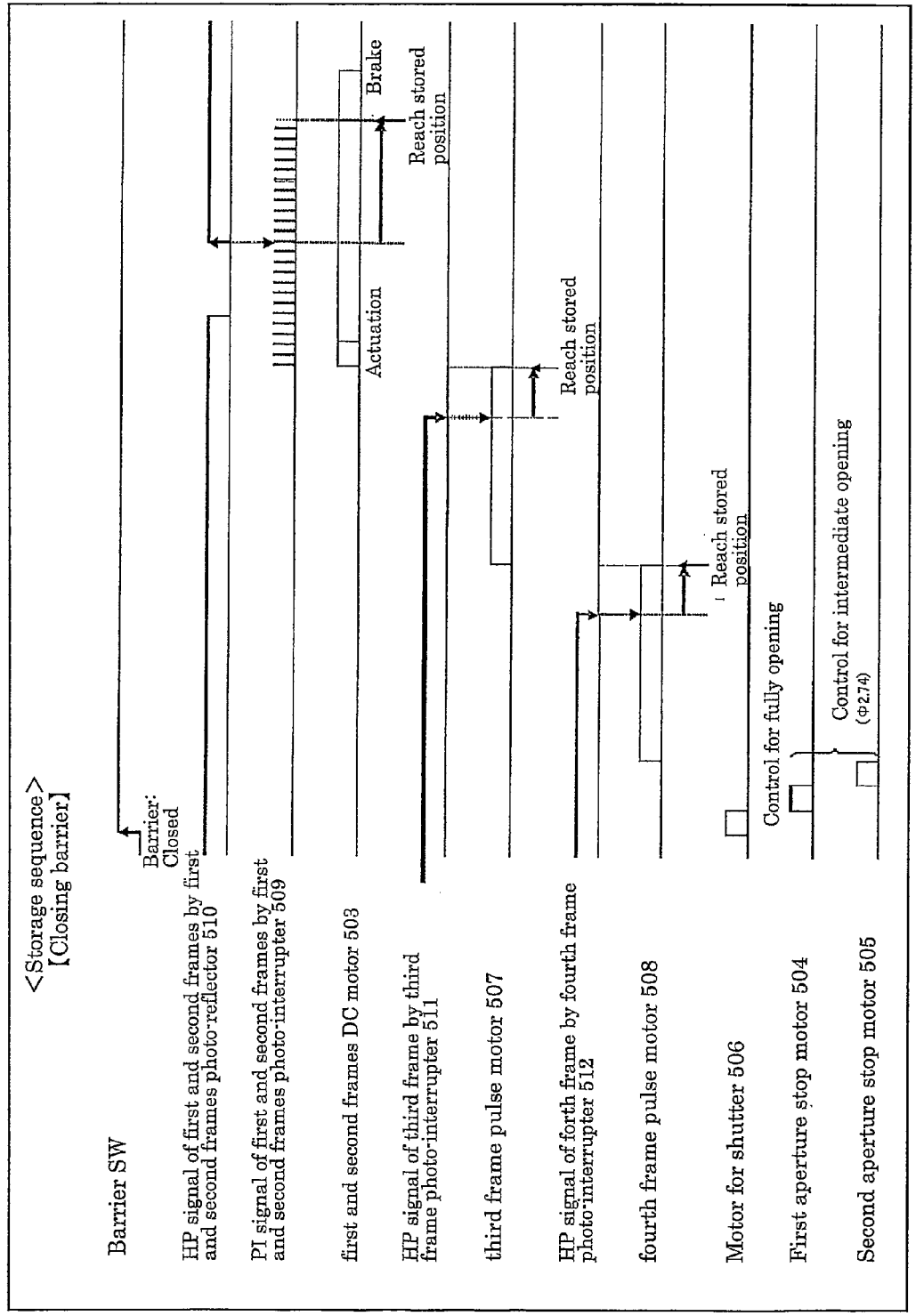

LENS BARREL, CAMERA AND PORTABLE INFORMATION TERMINAL APPARATUS

CROSS-REFERENCE TO RELATED APPLICATIONS

The present application claims the priority benefit of Japanese Patent Application 2004-217924 filed on Jul. 26, 2004. In addition, the present application is related to the U.S. patent application entitled "Lens Barrel, Camera and Mobile Information Terminal", which claims the benefit of priority to Japanese patent application No. 2004-217539 filed on Jul. 26, 2004; Japanese Patent Application 2005-044909, filed on Feb. 22, 2005; and Japanese Patent Application 2005-127226, filed on Apr. 25, 2005. In addition, the present application is related to the U.S. patent application entitled "Lens Barrel, Camera and Portable Information Terminal", which claims the benefit of priority to Japanese Patent Application No. 2004-217927, filed on Jul. 26, 2004. In addition, the present application is related to the U.S. patent application entitled "Optical System Apparatus, Camera and Portable Information Terminal Apparatus", which claims the benefit of priority to Japanese Patent Application No. 2004-217932, filed on Jul. 26, 2004, and Japanese Patent Application No. 2004-348005, filed on Dec. 1, 2004. The contents of each of the above-identified applications are incorporated herein by reference.

TECHNICAL FIELD

The present invention relates to a lens barrel which collapses lens groups when not in use, and protrudes the lens groups to predetermined positions when photographing. More particularly, the present invention relates to a lens barrel, a camera and a portable information terminal apparatus including a lens barrel suitable for a zoom lens unit that can change a focal distance by relatively moving a plurality of lens groups.

BACKGROUND ART

With improvement in high performance of a photographing lens such as a zoom lens unit which is capable of changing the focal distance and in downsizing according to the user's demand as to an image pickup apparatus such as a digital camera, there are increasing types of image pickup apparatus employing a so-called collapsing photographing lens unit in which lens cylinders are collapsed within a body of the image pickup apparatus when photographing is not carried out. Furthermore, since not only a simple reduction in dimensions but also a further reduction in a thickness of the image pickup apparatus are also demanded, it is now important to reduce the thickness of the lens barrel portion in a collapsed state.

As a technology to cope with the demand for reduction in the thickness of the image pickup apparatus, a construction has been used, in which the lens cylinders are collapsed into the body of the image pickup apparatus when the photographing is not carried out and in which a part of the lenses is evacuated from an optical axis of the lenses in photographing, when the lens cylinders are collapsed. Such a technology is disclosed, for example, in JP-A 2003-315861 and in JP-A 2003-149723. According to the structures disclosed in these Japanese unexamined patent application publications, since a part of the lenses is evacuated from the optical axis when the lens cylinders are collapsed, the dimension of the entire lenses in a direction of the optical axis can be reduced in the collapsed state, so that the thickness of the image pickup apparatus can be reduced.

However, in the structures disclosed in JP-A 2003-315861 and JP-A 2003-149723, the position of the lens evacuated from the optical axis is substantially within that lens cylinder which has the maximum outer diameter. Therefore, the lens cylinders contribute to reduction in thickness of the image pickup apparatus when the lenses are collapsed, but the outer diameter of the lens barrel increases. When compared with a case where the lens is not evacuated from the optical axis, since the outer diameter of the lens cylinders increase, the dimensions of the lens cylinders, in particular, the dimensions of the lens cylinders as viewed in a plane orthogonal to the optical axis increase. As a result, there is a problem that the dimensions of the image pickup apparatus, in particular, the dimension as viewed from a front side of the image pickup apparatus increases.

DISCLOSURE OF THE INVENTION

An aspect of the present invention is to provide a lens barrel with a reduced dimension in a direction of an optical axis by a simple construction and reliable operation when the lenses are collapsed and which is capable of reducing the dimension of the lens barrel in a plane orthogonal to the optical axis. Other aspects of the invention are to provide a camera and a portable information terminal apparatus each using the above noted lens barrel.

According to one aspect of the present invention, a lens barrel comprises a telescopic cylinder including at least one movable cylinder, said telescopic cylinder being configured to be accommodated in a fixed cylinder; at least one movable lens retained in said at least one movable cylinder, an optical axis of said at least one movable lens determining a reference axis of said lens barrel; and a retractable lens configured to be retracted in a plane perpendicular to said reference axis from a photographing position on said reference axis to a retracted position off said reference axis, wherein, in a photographing state, said retractable lens is adjacent to said at least one movable lens, and said at least one movable lens and said retractable lens are coaxially aligned along said reference axis, and a movement of the retractable lens to the reference axis from the retracted position is initiated immediately after the at least one movable cylinder of the at least one movable lens reaching a maximum protruded position.

According to another aspect of the present invention, the above noted lens barrel is used in a camera to provide short and long focus.

Still, according to another aspect of the present invention, a portable information terminal apparatus includes the lens barrel to provide the short and long focus.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 17A and 17B are perspective views showing an exterior appearance and a structure of a camera according to a second embodiment of the present invention as viewed from the subject, in which FIG. 17A shows a state in which a photographing lens is collapsed in a body of the camera, and FIG. 17B shows a state in which the photographing lens is projected or extended from the camera body.

FIG. 24A is a table showing a reset sequence of the lens barrel.

FIG. 24B is a timing chart of an H signal.

FIG. 25 is a timing chart showing a storage sequence in a state in which the lens barrier is closed.

BEST MODE FOR CARRYING OUT THE INVENTION

Figure 1:
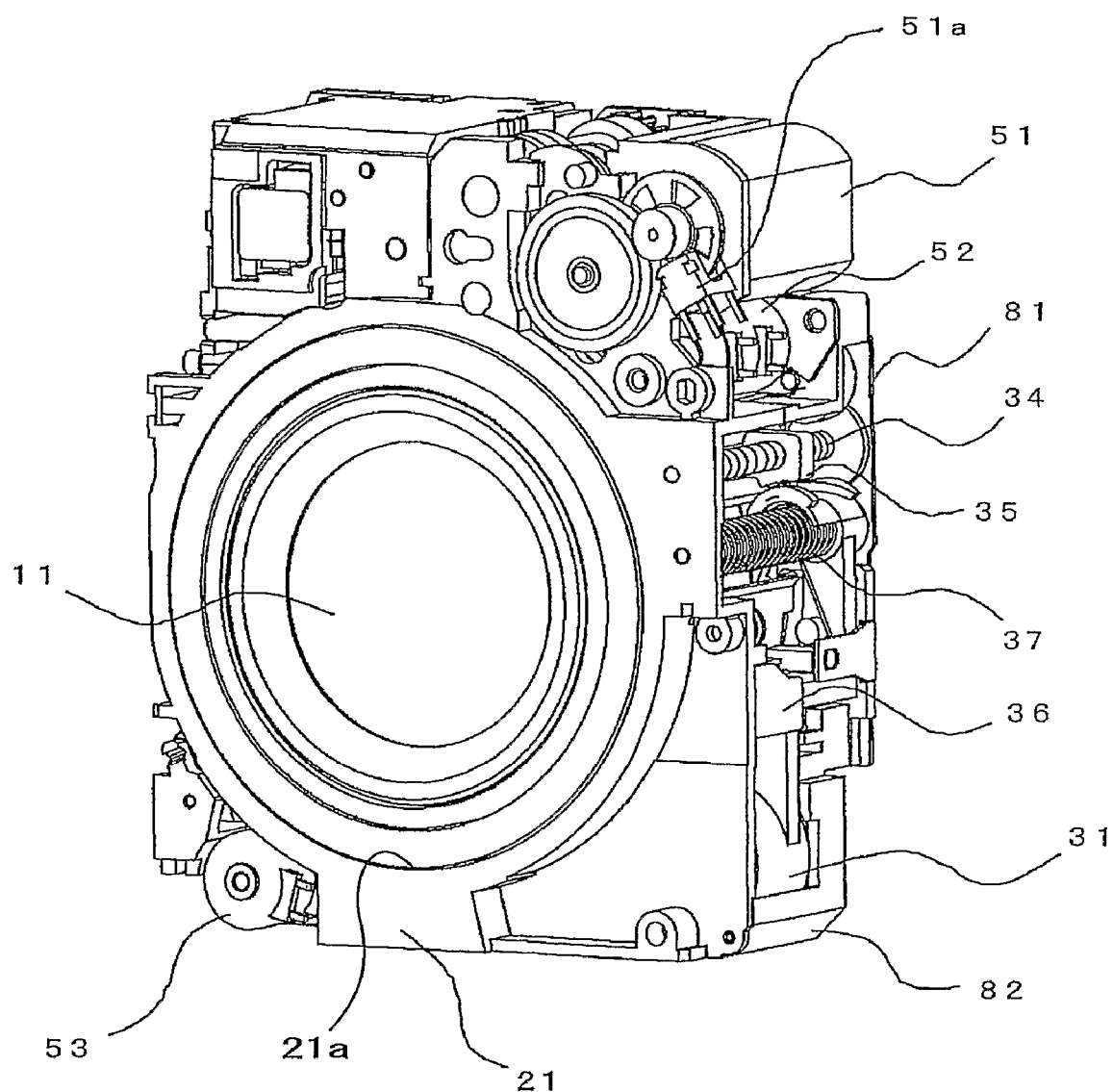
FIG. 1 is a perspective view showing a structure of a main part of an optical system device including a lens barrel according to a first embodiment of the present invention with lens groups collapsed, as view from a subject.

Reference will now be made in detail, based on preferred embodiments of the present invention, to the accompanying drawings. Wherever possible, the same reference numbers are used in the drawings and the description to refer to the same or like parts. The present invention, however, is not limited to these embodiments. Within the scope of the present invention, any structure and material described below can be appropriately modified.

FIGS. 1 to 16 and 20 illustrate a first embodiment of a lens barrel according to the present invention.

In FIGS. 1 to 16 and 20, the lens barrel includes a fixed frame 21 having a fixed cylinder 21a, a telescopic cylinder unit or telescopic cylinder attached to the fixed frame 21, and a plurality of lens groups disposed in the telescopic cylinder. The telescopic cylinder is movable and collapsible along an optical axis X of the plurality of lens groups.

Figure 9A:
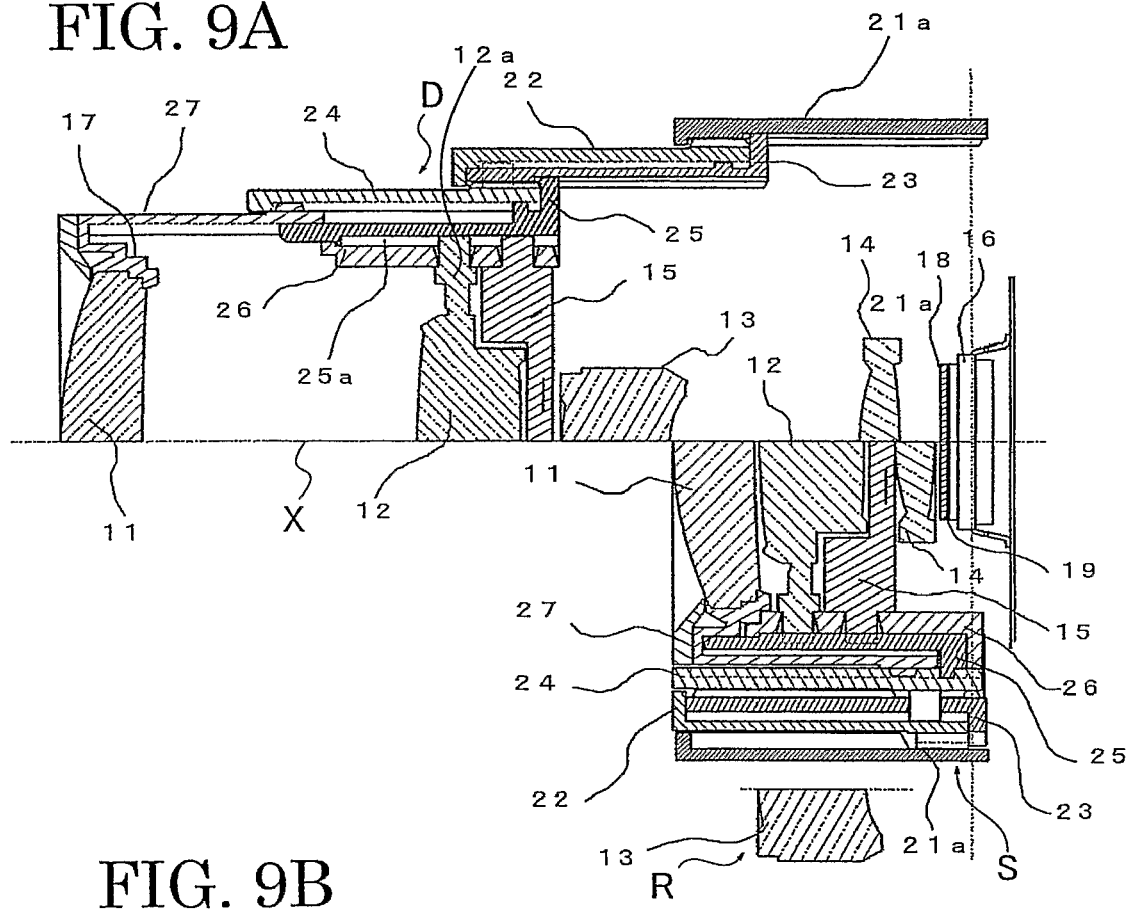
FIG. 9 is a vertical cross sectional view showing, in an upper half and a lower half with respect to an optical axis, main parts of the lens groups, the lens retaining frames, and the various lens cylinders of the lens barrel in the photographing state in which the lens groups are extended, and in the collapsed state in which the lens groups are retired to be collapsed, respectively.
Figure 9B:
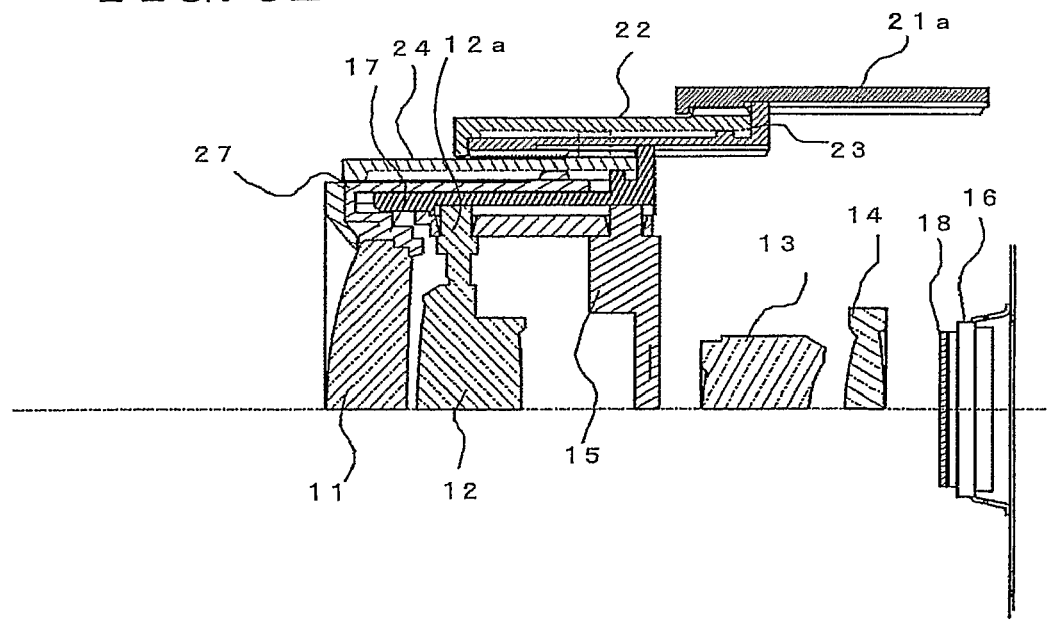

The lens groups comprise, for example, a first lens group (movable lens) 11, a second lens group (movable lens) 12, a third lens group (movable lens) 13, and a fourth lens group (movable lens) 14, which are disposed in the telescopic cylinder (see FIG. 9).

The telescopic cylinder includes at least one movable cylinder. In this embodiment, the telescopic cylinder includes, for example, a first rotary cylinder 22, a first liner 23, a second rotary cylinder 24, a second liner 25, a cam cylinder 26, a lineally-moving cylinder 27, and a third frame 31 (see FIGS. 5 and 8) for retaining the third lens group (retractable lens) 13. As described below, the first rotary cylinder 22 and so on are moved along the optical axis with respect to each other with the plurality of lens groups 11 to 14. Any shape or structure may be used instead of the telescopic cylinder. For example, a plurality of peripherally spaced slidable bars or bands may be used without being limited to the cylinder shape of the telescopic cylinder.

As shown in FIG. 9, the first, second, third, and fourth lens groups 11, 12, 13, and 14 are positioned from a subject (not shown) in sequence and disposed on the optical axis X. A shutter/aperture stop unit 15 is disposed between the second lens group 12 and the third lens group 13. The first, second, third, and fourth lens groups 11, 12, 13, and 14, and the shutter/aperture stop unit 15 are configured to be movable in a direction of the optical axis when the telescopic cylinder is moved along the optical direction.

To use the lens barrel for image forming apparatuses or optical devices such as digital cameras or the like, as described hereinafter, for example, a solid-state image-sensing device 16 comprising a CCD (charge-coupled device) or the like is disposed adjacent to the side of an image forming plane of the fourth lens group 14.

Referring to FIG. 9, the first lens group 11 is attached to a first frame 17, and a cover glass 18 and a low-pass filter 19 are disposed adjacent to an image-receiving surface of the CCD 16, if needed.

Generally, as shown in FIG. 9, the lens barrel is structured such that the first to fourth lens groups are movable between a collapsed position S stored in the fixed cylinder 21a and an extended position D extended out of the fixed cylinder 21a, a zooming is achieved, and at least one lens group of the first to fourth lens groups can be retracted out of the optical axis into a retracted position as shown at R in FIG. 9. In the embodiment, at least one portion of the third lens group 13 is retracted from the optical axis passing through a through hole provided in the fixed cylinder 21a into a stored part provided in the fixed frame 21 and corresponding to the retracted position as described above.

In regard to this, a further detailed description will be described hereinafter.

The first lens group 11 to the fourth lens group 14 has a zoom lens function in which a focal distance is variable, as described hereinafter. The first lens group 11 includes one or more lens, and is fixed to the lineally-moving cylinder 27 via the first frame 17, which retains the first lens group 11 integrally.

The second lens group 12 includes one or more lens. A cam follower formed on a second frame (not shown) for integrally retaining the second lens group 12 is inserted into a cam groove for the second lens group 12 formed on the cam cylinder 26 shown in FIGS. 9 and 11, and engages with a linear groove 25a of the second liner 25, and the second lens group 12 is supported by the cam cylinder 26 and the second liner 25.

Figure 11:
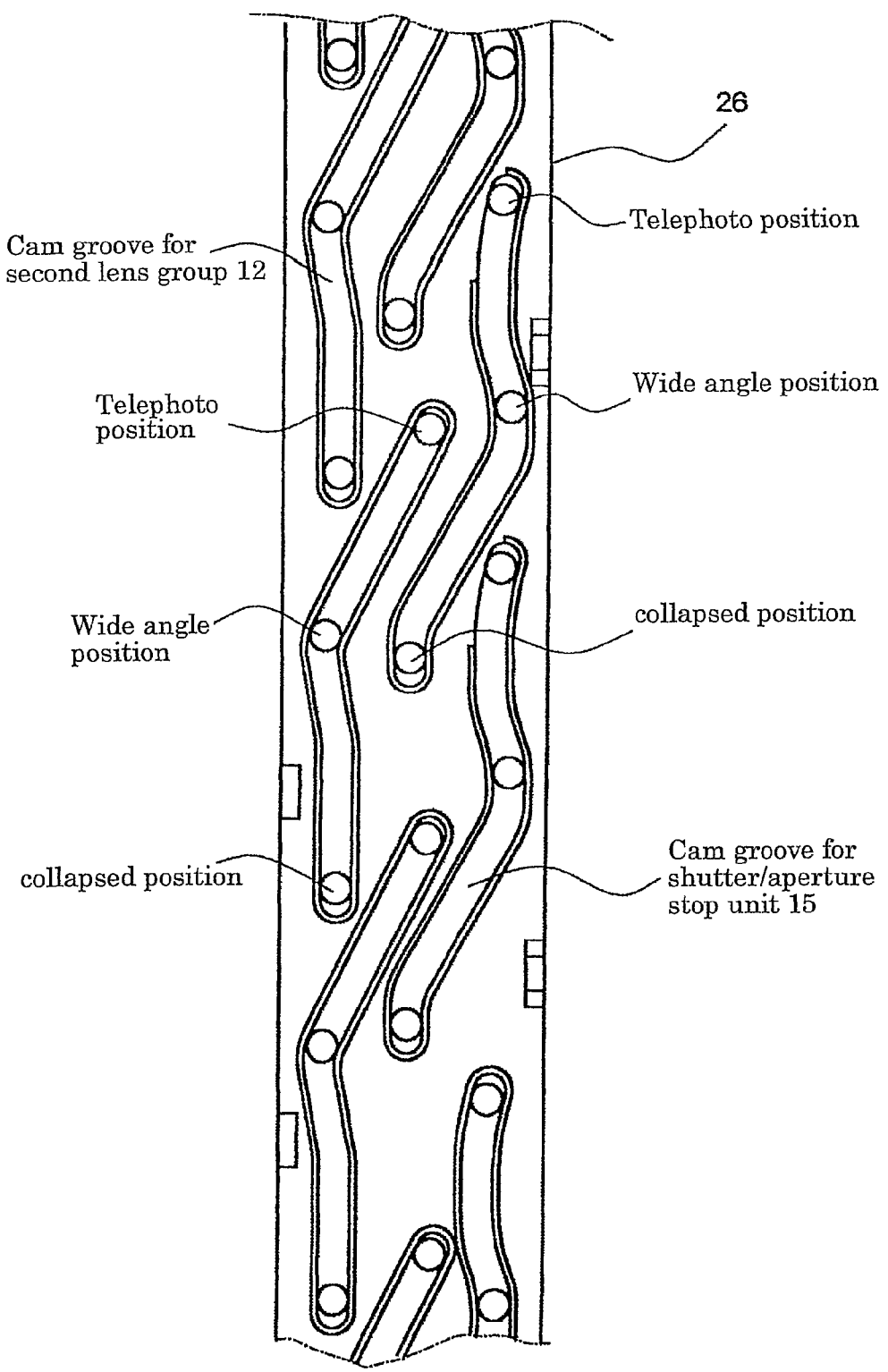
FIG. 11 is a schematic development elevational view showing a shape of cam grooves formed on a cam cylinder in a developed state.

The shutter/aperture unit 15 includes a shutter and an aperture, and a cam follower formed integrally with the shutter/aperture unit 15 is inserted into a cam groove for the shutter/aperture of the cam cylinder 26 shown in FIG. 11 and is engaged with the linear groove 25a on the second liner 25 so that the shutter/aperture unit is supported by the cam cylinder 26 and the second liner 25.

Figure 13A:
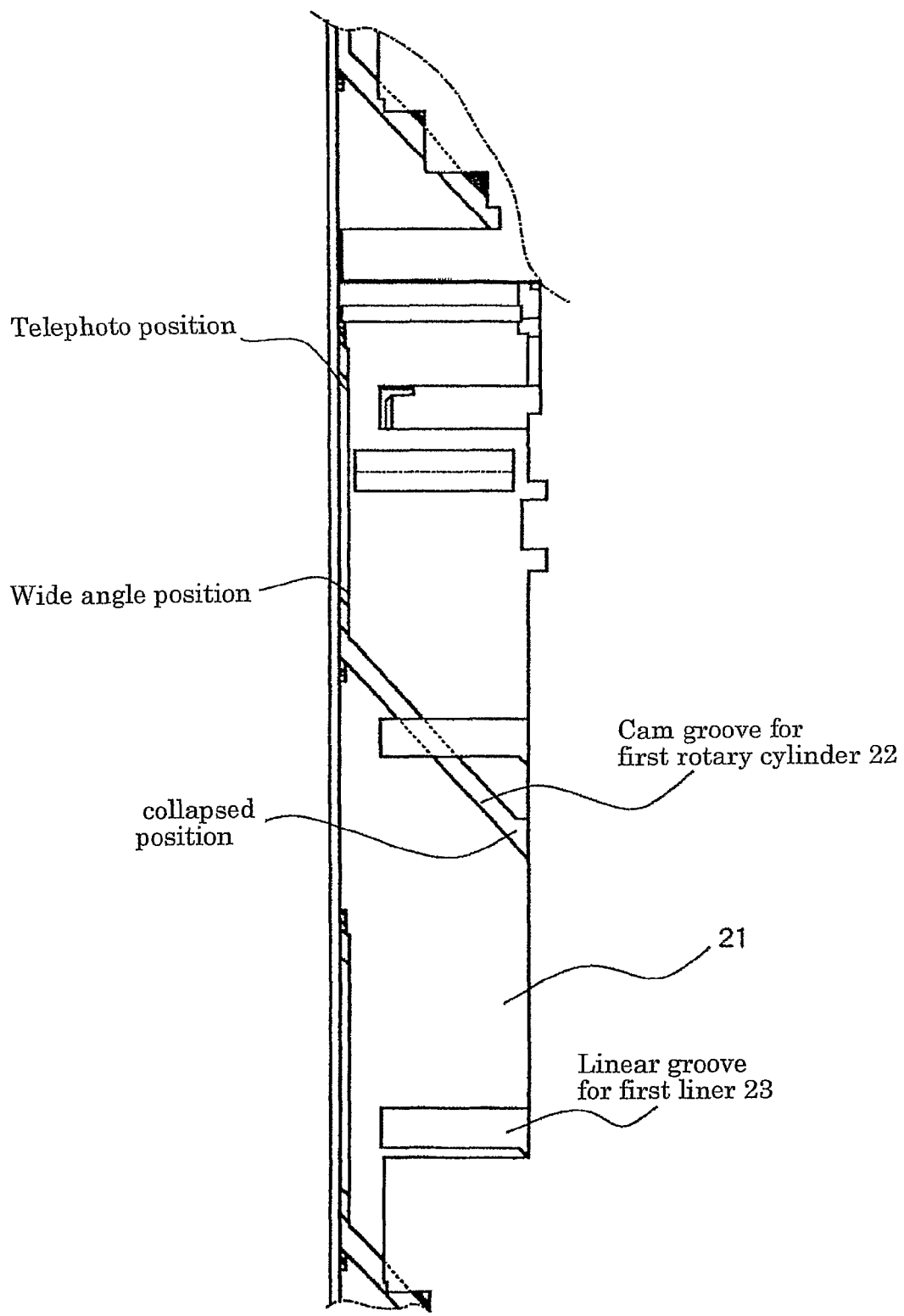
FIG. 13 is a schematic development elevational view showing a shape of cam grooves and key grooves formed on a fixed frame in a developed state with the helicoid omitted.
Figure 13B:
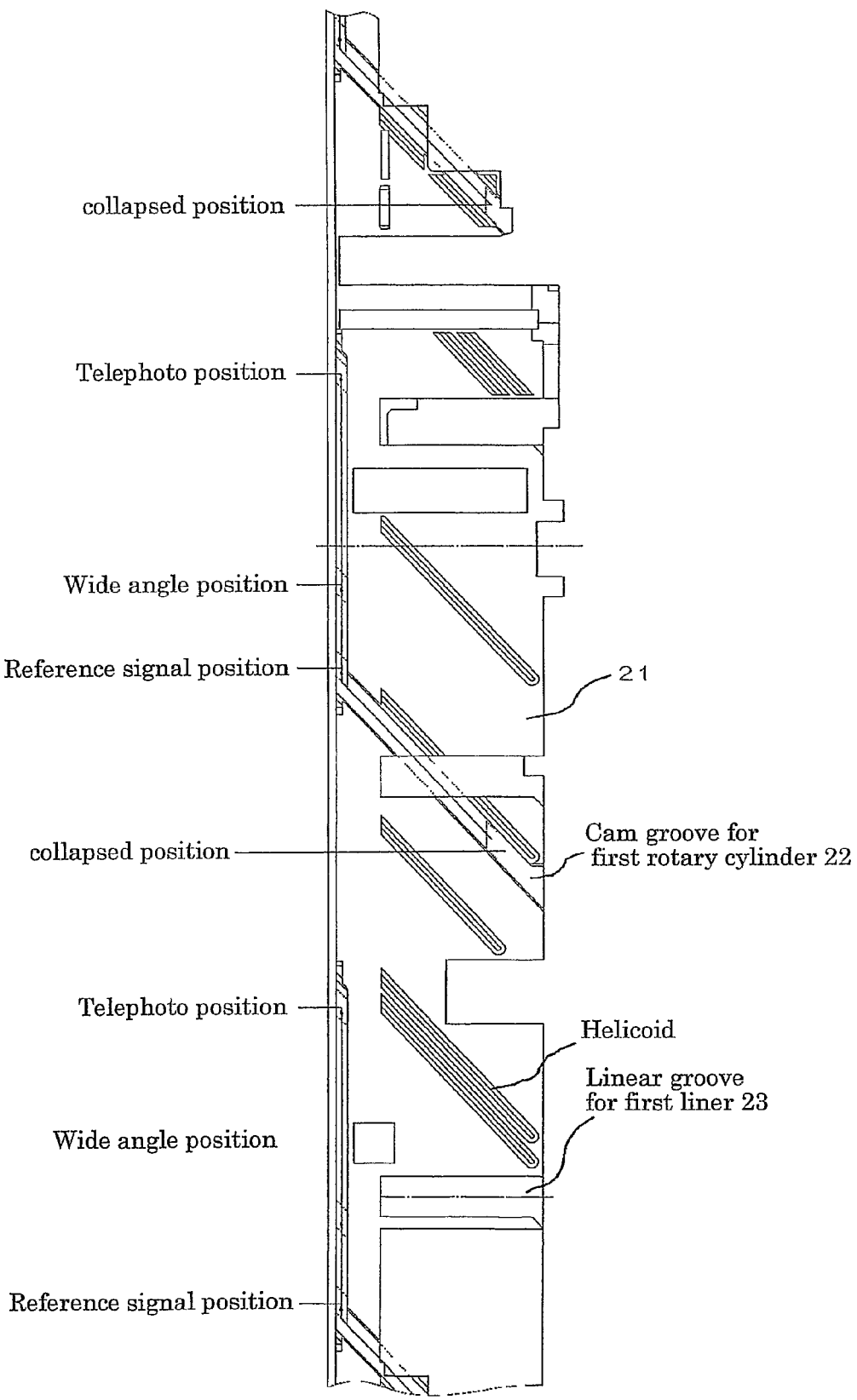
Figure 13C:
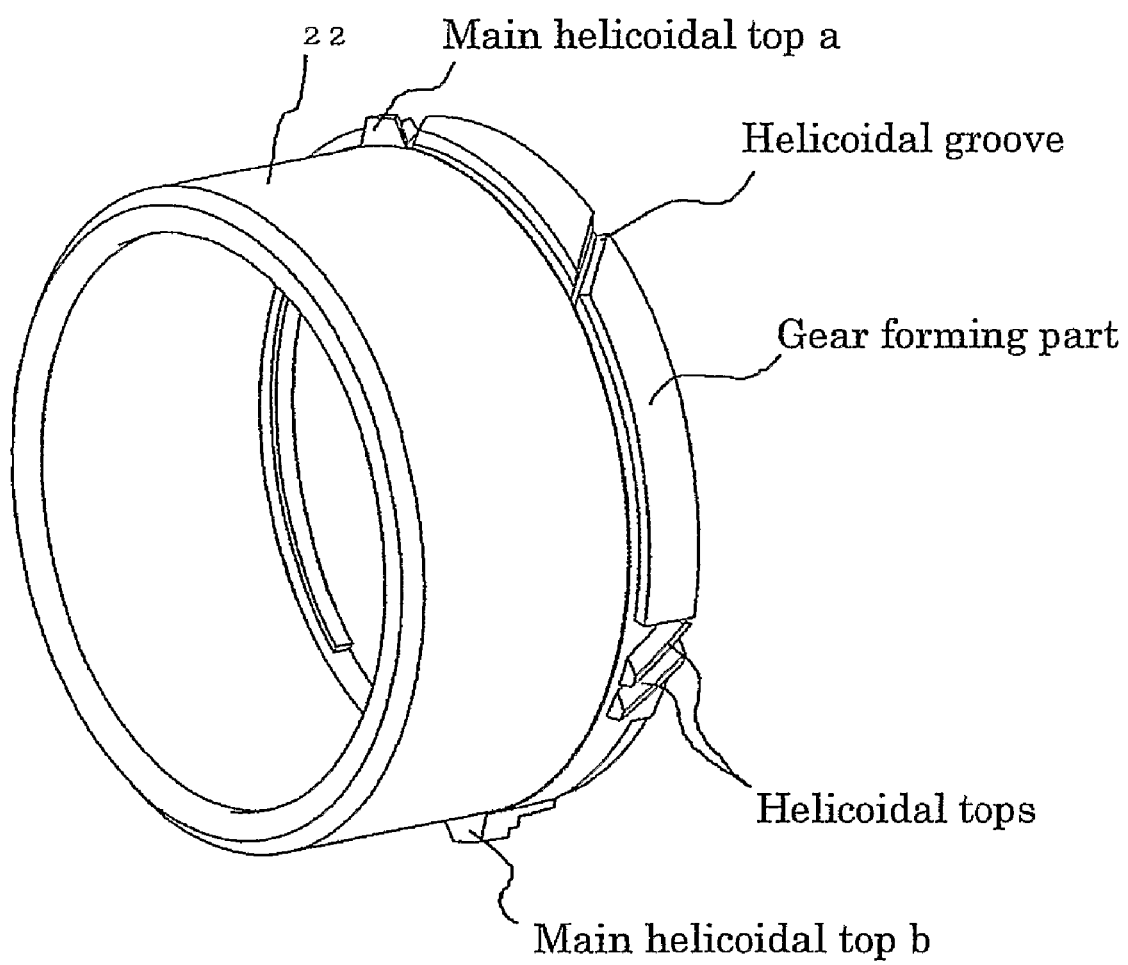

The fixed frame 21 includes a cylindrical part (i.e. the fixed cylinder 21a) having an inner surface which is formed with a linear groove and a helicoidal cam groove along an axial direction, as shown in FIGS. 13A and 13B. A helicoidal cam follower formed on an outer peripheral surface of a base portion of the first rotary cylinder 22 engages with the helicoidal cam groove, as shown in FIG. 13C, and a key portion formed on an inner surface of a base portion of the first liner 23 engages with the linear groove of the fixed frame of the fixed frame 21. An inner surface of the first rotary cylinder 22 is formed with a guide groove extending along a plane transverse to the optical axis X. Engaged with the guide groove is a follower or key which is formed to project from the outer peripheral surface of the first liner 23 in the vicinity of the base portion thereof and acts as a linear member.

An inner surface of the first liner 23 is formed with a linear groove along the optical axis and a helicoid, in addition, the first liner 23 is formed with a clearance groove in which a cam follower formed to project from an outer peripheral surface of a base portion of the second rotary cylinder 24 in the vicinity of the base portion is inserted.

A helicoid is formed on the outer peripheral surface of the base portion of the second rotary cylinder 24, and is engaged with the helicoid of the first liner 23. A cam follower formed to project from the outer peripheral surface of the second rotary cylinder 24 in the vicinity of the base portion engages with the linear groove formed in the inner periphery of the first rotary cylinder 22 through the clearance groove of the cam follower on the first liner 23. A key portion formed to project from the outer peripheral surface of the base portion of the second liner 25 engages with the linear groove provided on the inner peripheral surface of the first liner 23.

An inner surface of the second rotary cylinder 24 is provided with a guide groove along a plane transverse to the optical axis X, a follower or key provided to project from the outer peripheral surface of the second liner 25 is engaged in the guide groove of the second rotary cylinder 24. With such a structure, the second liner 25 moves with the second rotary cylinder 24 in the movement along the optical axis X, while the second rotary cylinder 24 is rotatable relative to the second liner 25.

The cam cylinder 26 fitted to the inner periphery of the second liner 25 is configured in such a manner that an engaging projection formed on the outer peripheral surface of the base portion is fitted to and engaged with the base portion of the second rotary cylinder 24 so as to rotate integrally with the second rotary cylinder 24. The inner surface of the second liner 25 is provided with a guide groove along a surface transverse to the optical axis X, and a follower or key provided on the outer peripheral surface (front side) of the cam cylinder 26 engages with the cam groove. With such a structure, the cam cylinder 26 moves with the second liner 25 in the movement along the optical axis X, while is rotatable relative to the second liner 25.

The base portion of the lineally-moving cylinder 27 is inserted between the second rotary cylinder 24 and the second liner 25, and a cam follower is formed to project from the outer peripheral surface of the lineally-moving cylinder 27 in the vicinity of the base portion, and the cam follower engages with the cam groove formed in the inner peripheral surface of the second rotary cylinder 24. A linear groove is formed on the inner peripheral surface of the lineally-moving cylinder 27 along the axial direction, and the key portion formed on the outer peripheral surface of the second liner 25 engages with the linear groove.

A gear portion is formed on the outer periphery of the base portion of the first rotary cylinder 22, the gear portion is engaged with one or more gears which are driven by a zooming motor 51 so that a drive force of the zooming motor 51 is transmitted to the gear portion via the gears, whereby the first lens group 11, the second lens group 12, and the shutter/aperture unit 15 are zoomed in a predetermined manner. The zooming motor comprises a usual DC motor in the embodiment.

Figure 10:
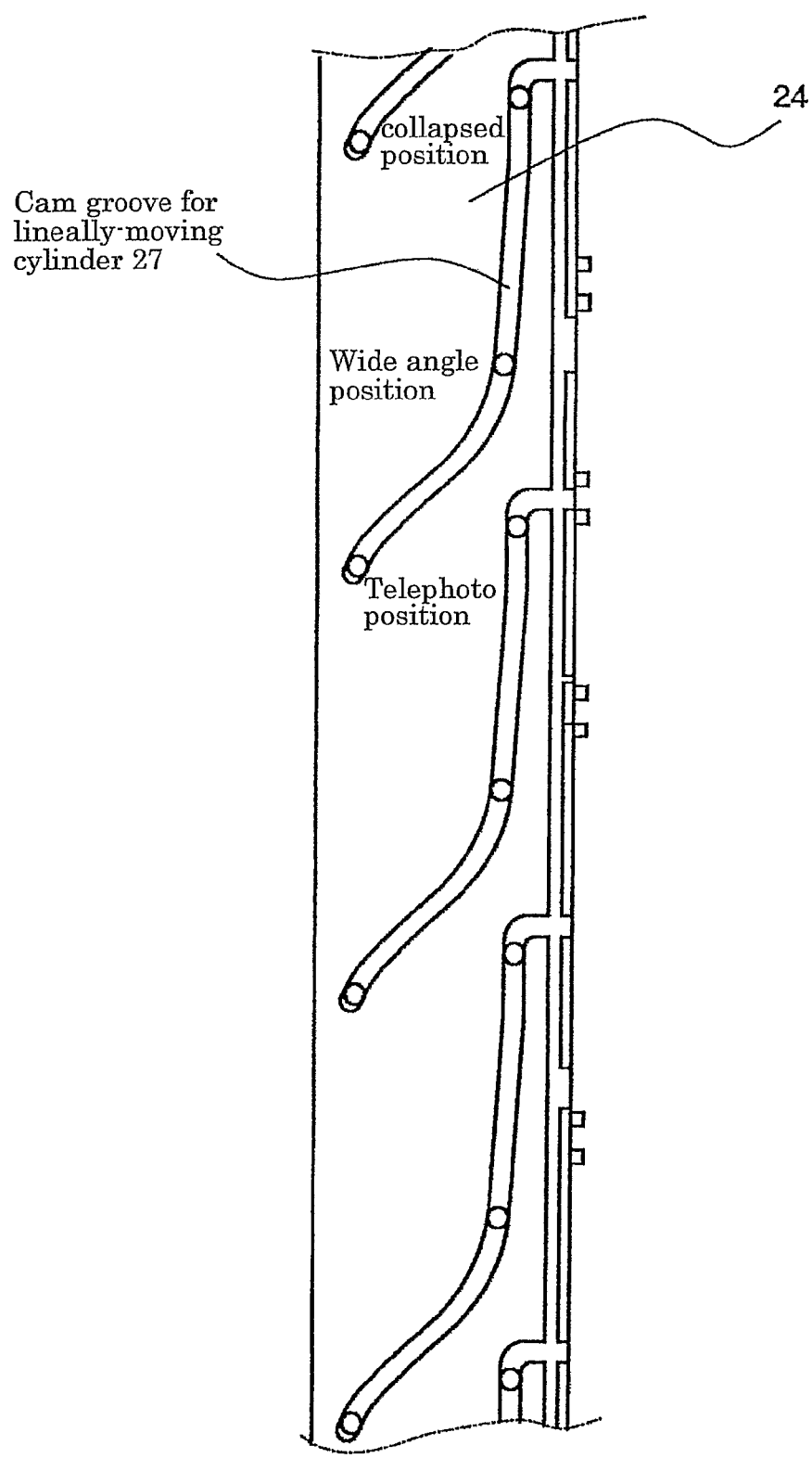
FIG. 10 is a schematic development elevational view showing a shape of cam grooves formed on a second rotary cylinder in a developed state.

Meanwhile, the cam groove on the second rotary cylinder 24 engaging with the cam follower on the linearly-moving cylinder 27 is shown in FIG. 10.

The cam groove on the cam cylinder 26 which engages with the cam follower on the lens retaining frame of the second lens group 12 and the cam groove of the cam cylinder 26 which engages with the cam follower of the shutter/aperture unit 15 are shown in FIG. 11, respectively.

Figure 12:
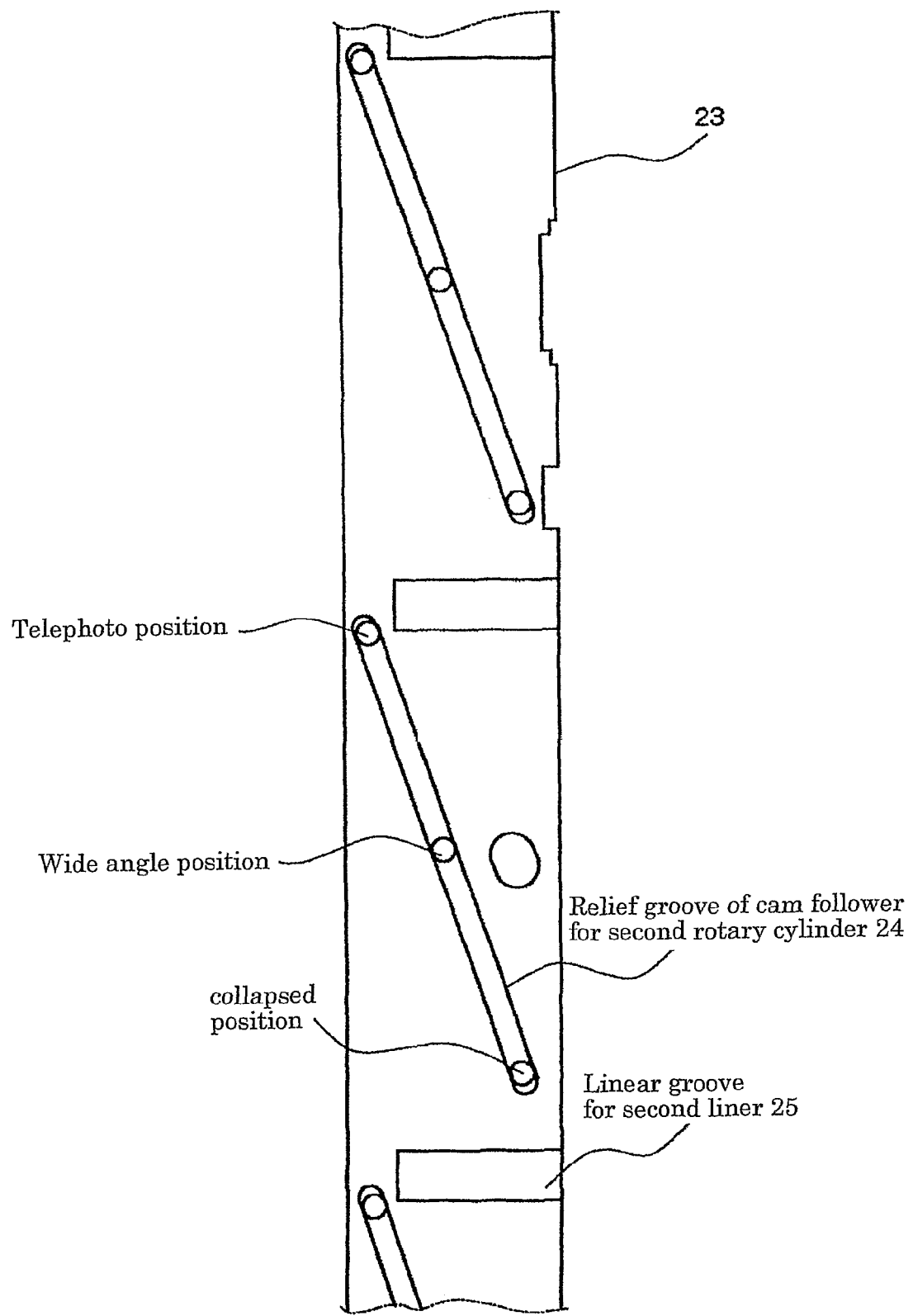
FIG. 12 is a schematic development elevational view showing a shape of cam grooves and key grooves formed on a first liner in a developed state with a helicoid omitted.

The cam groove on the first liner 23 which engages with the cam follower of the second rotary cylinder 24 and the straight groove on the first liner 23 which engages with the key groove on the second liner 25 are shown in FIG. 12, respectively.

A linear groove on the fixed frame 21 engaging with the key portion of the first liner 23 of the fixed frame and the cam groove of the fixed frame 21 engaging with the cam follower of the first rotary cylinder 22 are shown in FIG. 13, respectively.

Generally, the rotary cylinder, which is the closest position to the fixed frame and positioned on the outermost circumference is generally screwed onto the fixed frame through a helicoid, and the helicoid is configured to move the rotary cylinder at a constant speed relative to the fixed frame. Therefore, the rotary cylinder is in a half-extended state out of the fixed frame in a short focal length/wide angle position in a course in which the rotary cylinder is moved gradually from the collapsible position through the short focal length/wide angle position to a long focal length/telephoto position.

On the contrary, in the structure described above, the first rotary cylinder 22 adjacent to the fixed frame 21 is threaded with the fixed frame of the fixed frame 21 via the cam groove of the helicoidal shape without a simple helicoidal connection. The first rotary cylinder 22 is moved completely to the maximally extended position by being driven from the collapsible or collapsed position to the short focal length/wide angle position. Thereafter, as shown in FIG. 13, because the subject side end of the cam groove lies in parallel with the end surface of the fixed frame, the first rotary cylinder 22 rotates at a constant position without moving along the optical axis X during driving from the short focal length/wide angle position to the long focal length/telephoto position.

In addition, the third lens group 13 is retracted out of the optical axis X in the collapsed position, in which the lens groups are collapsed in the fixed frame 21, as shown in FIG. 9. The third lens group 13 is moved onto the optical axis X in an extended position of the lens groups.

As the first rotary cylinder 22 is moved from the collapsed position to short focal length/wide angle position, it is extended toward the subject, while rotating in an early stage of the drawing out action and when it reach the maximally extended position, a zoom position-detector which is provided on the fixed frame 21 and comprising a photo-reflector, photo-interrupter, leaf switch or the like, for example, generates a zoom position-reference signal. Therefore, when the zoom position-reference signal generates, because it may be determined that the first rotary cylinder 22 reaches the maximally extended position, it is possible to initiate to move the third frame 31 onto the optical axis X. Consequently, a space between the second lens group 12 and the fourth lens group 14 to insert the third lend group 13 into the optical axis X can be secured previously by completely drawing out the first rotary cylinder 22 and the first liner 23 adjacent to the fixed frame at the earlier step of the extended action.

As described below, as soon as the first rotary cylinder 22 reaches the maximally extended position, the zoom position-reference signal generates, the space for inserting the third lens group is secured, and immediately, the insertion of the third lens group is initiated. Therefore, a time from the collapsible position when an electric source is turned on to the short focal length/wide angle position can be much shortened.

Figure 2:
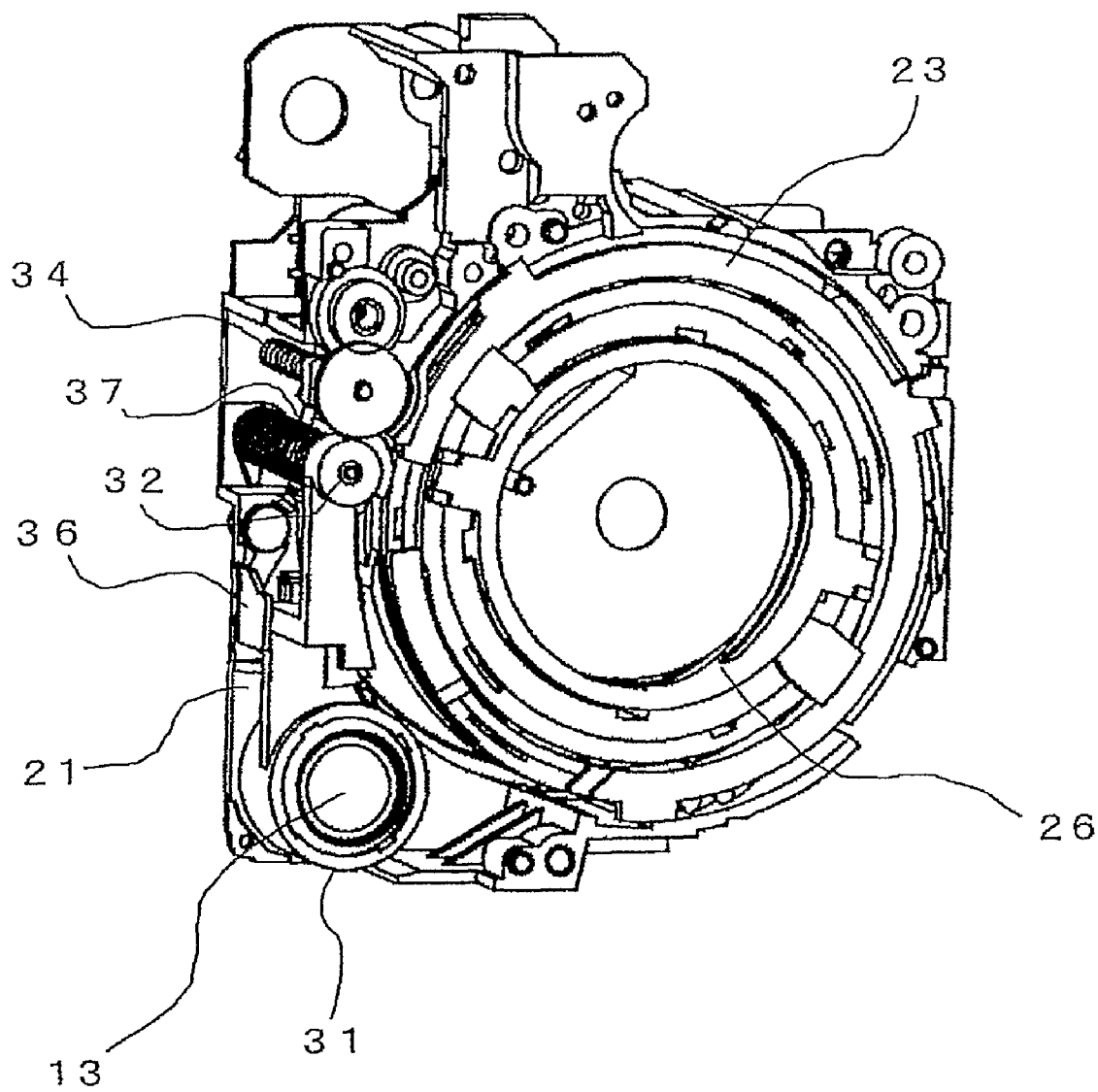
FIG. 2 is a perspective view showing the main part of the lens barrel shown in FIG. 1, as viewed from an imaging plane.
Figure 8:
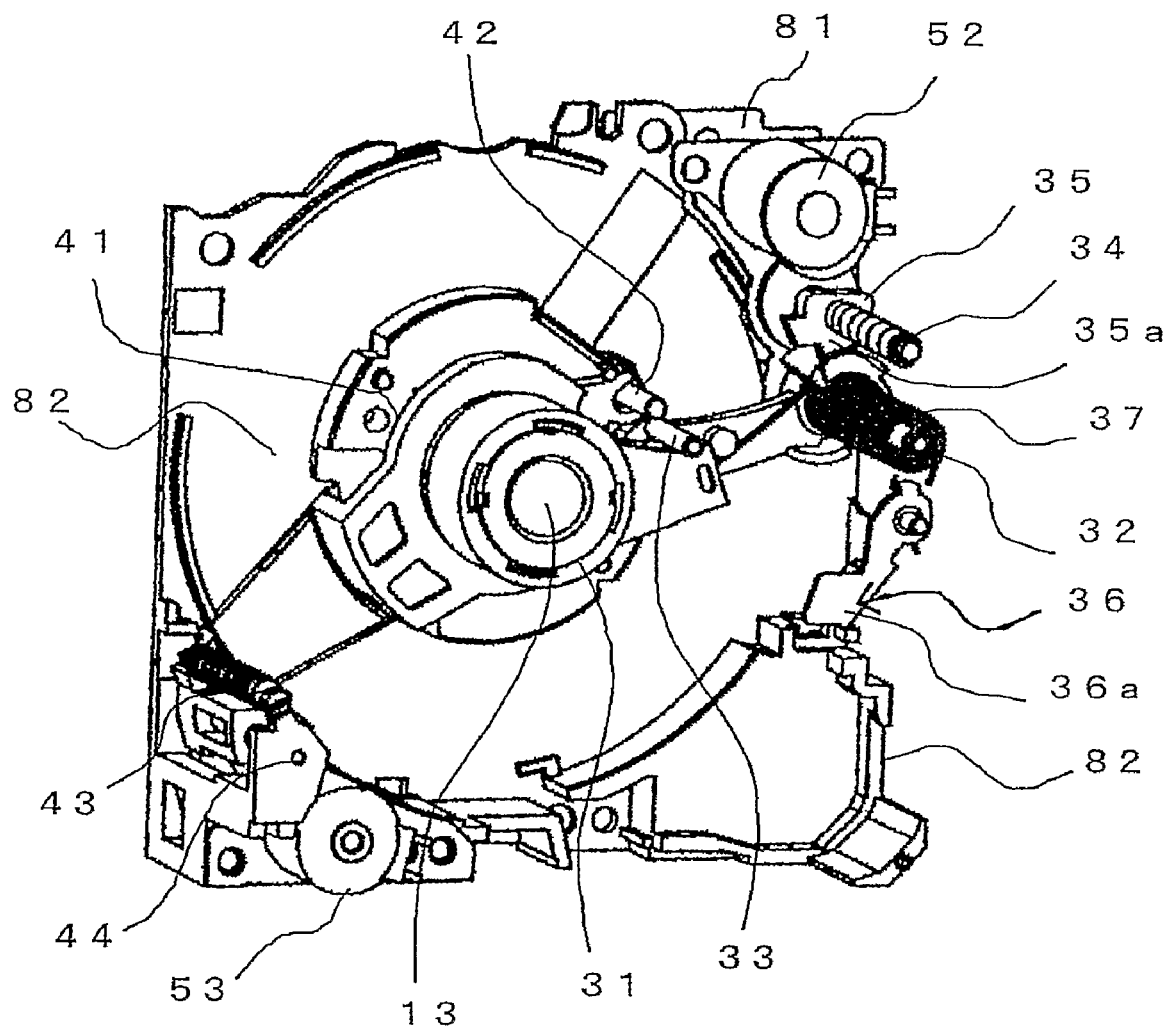
FIG. 8 is a perspective view of a layout of the third frame, the impact preventing member, and the fourth frame for explaining operations of the third frame, which retains the third lens group, and the impact-preventing member in the photographing state with the lens groups projected, as viewed from the subject.

As described above, the retractable third lens group 13 is retained to the third frame 31 or retractable lens retaining frame. The third frame 31 retains the third lens group 13 at one end thereof, and the other end of the third frame 31 is supported by a third group main-guide shaft 32 which extends substantially in parallel with the optical axis of the third lens group 13 so as to be capable of rotating, and sliding along the third group main-guide shaft 32. The third frame 31 is rotatable about the third group main-guide shaft 32 between a setting position in which the third lens group 13 is disposed onto the optical axis in a photographing state, as shown in FIG. 8 and the retracted position in which the third lens group 13 is retracted out of the telescopic cylinder into the fixed frame 21, as shown in FIG. 2.

In the vicinity of the third lens group 13 on the side of the rotating end of the third frame 31, a crank-shaped bent portion for differentiating the position of the third lens group 13 in the direction parallel with the main guide shaft between the side of the rotation axis and the side of the supporting portion, a stopper 31a (FIG. 15) and a light-shielding strip 31b are provided on the rotating end to project from the bent portion substantially toward the rotating end.

On the optical performance, in order to lengthen a focus length in the telephoto state, a position of the third lens group 13 in the telephoto state is in an extended position closer to the subject. However, a possible moving amount of the third frame 31 is determined by limitation of a length of the lens barrel in the collapsed state along the optical axis X. It is possible to maximize the focus length in the telephoto state by setting a position for retaining the third lens group by the third frame 31 in the closest position to the subject. However, if a position of the stopper 31a along the optical axis sets on the generally same position as the third lens group 13, a length of a third frame sub-guide shaft 33 is longer and a size of the lens barrel in the collapsible position becomes greater. Therefore, it is required that the stopper 31a is set on a side of a focusing position and the third frame 31 is formed into a shape having the crank-shaped bent portion.

Meanwhile, the third frame 31 may be formed from two parts and in this case, one is a member having the crank-shaped bent portion, the other is a member for retaining the third lens group 13. The two parts operates integrally by being fixed together.

Figure 14A:
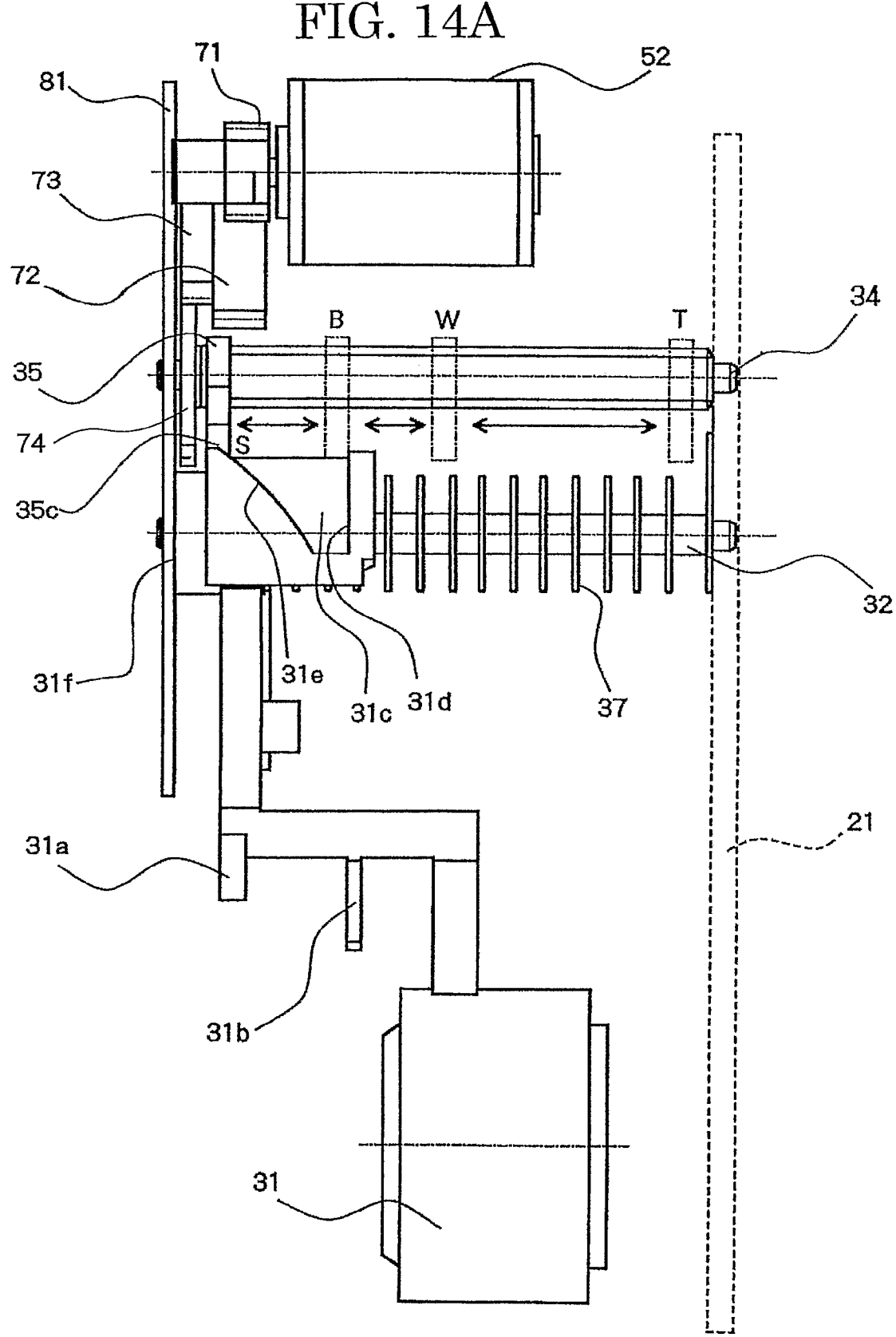
FIG. 14 is a side view showing a structure of the third frame and its drive system.
Figure 14B:
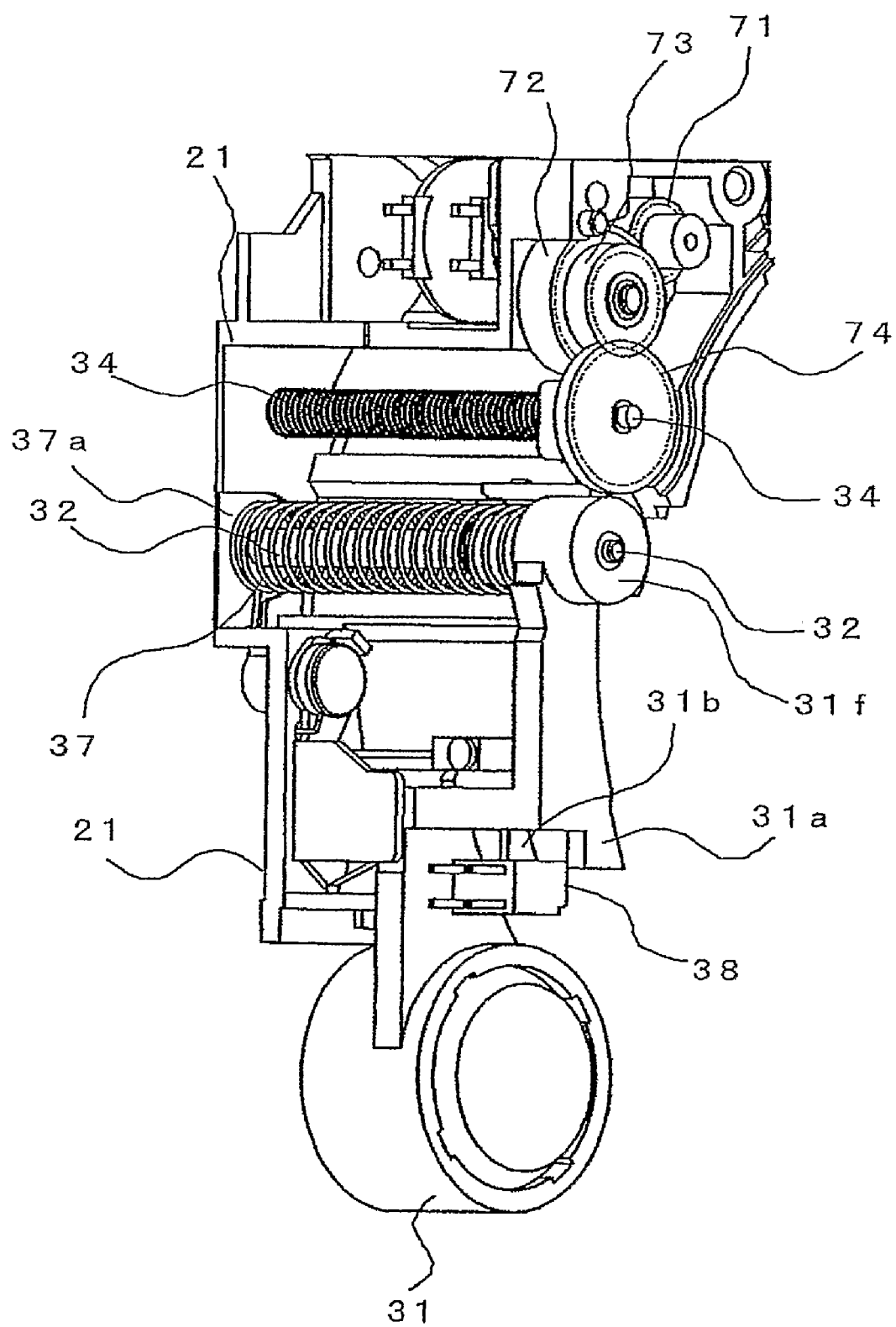
Figure 15:
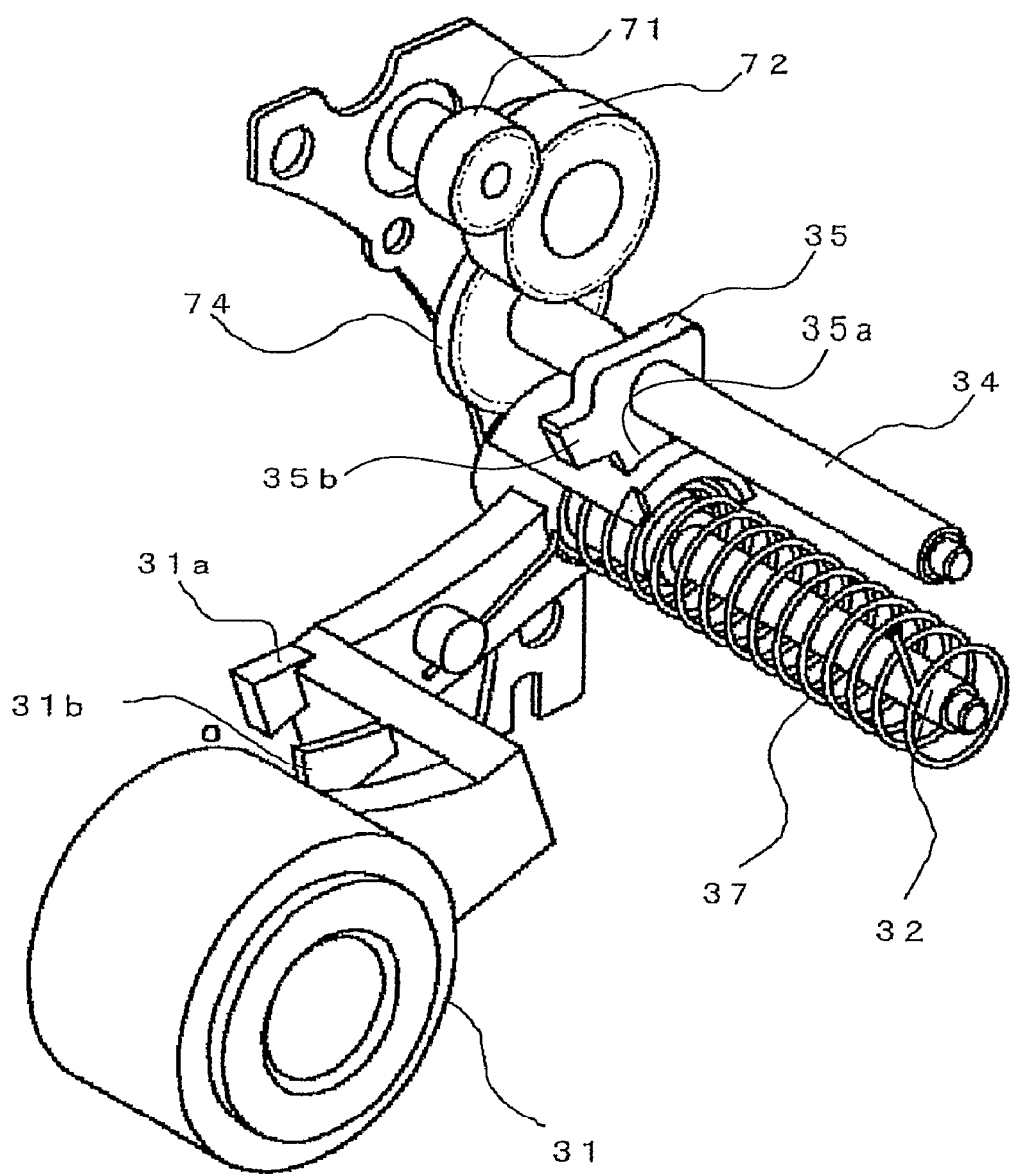
FIG. 15 is a perspective view showing the structure of the third frame and its drive system.

As shown in FIGS. 14A and 14B, a third frame female screw member 35 screwed on a third group lead screw 34 is positioned in the closest position to an image plane of the CCD in the retracted state in which the third frame 31 is retracted. In this state, a compression torsion spring 37 is charged or compressed fully so as to impart constantly a clockwise moment as viewed from the front of the lens barrel to the third frame 31.

A cylindrical outer peripheral surface of a supported part 31g provided on the main-guide shaft 32 for the third frame 31 is provided with a stepped portion 31c, and a cam portion 31e disposed inside the stepped portion 31c and formed from an inclined surface, as shown in FIG. 14A.

From this state, when a third frame drive motor 52 is rotated clockwise as viewed from the front of the lens barrel, the third group lead screw 34 is rotated clockwise through a gear mechanism including gears 71 to 74, and the third frame female screw member 35 moves toward the subject along the optical axis X. At this time, the third frame 31 is rotated clockwise by a moment force of the compression torsion spring 37, the cam portion 31e engages with a first abutting portion 35a provided on the third frame female screw member 35.

Thereafter, when the third frame female screw member 35 is moved in the closest position to the subject, the light-shielding strip 31b of the third frame 31 is moved to a position out of a third frame photo-interrupter 38 as a device for detecting a position of the third lens group 13, thereby the third frame photo-interrupter 38 generates a reference signal in a range from L or a low level to H or a high level. Accordingly, a position of the third lens group 13 is controlled by pulse count based on the reference signal from the third frame photo-interrupter 38.

Figure 16A:
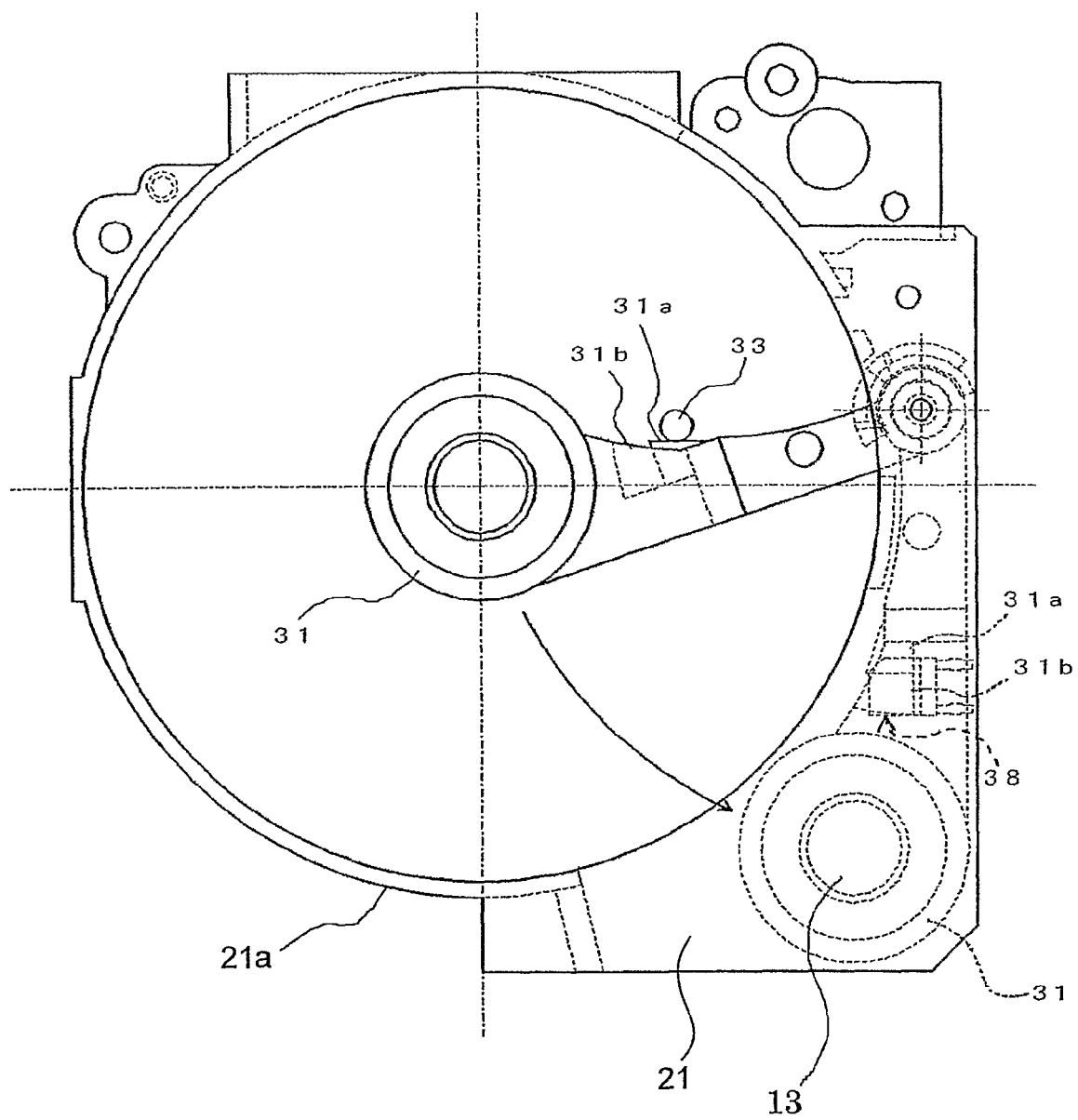
FIG. 16 is a back view of the third frame portion for explaining operation of the third frame, as viewed from the imaging plane.
Figure 16B:
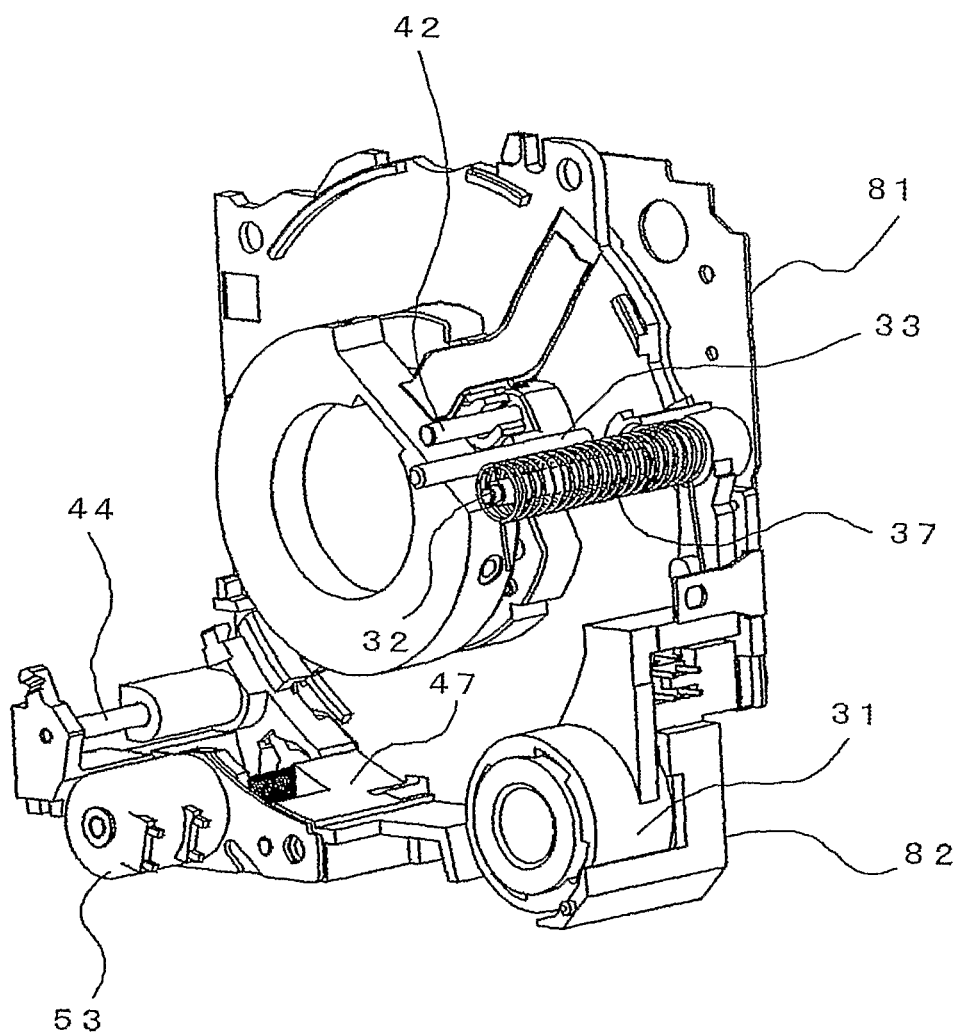

From this state, when the third frame female screw member 35 is moved to a retract-initiating position B of the third frame 31, as shown in FIG. 14A, the third frame 31 further rotates clockwise, the stopper 31a comes into abutment with the third frame sub-guide shaft 33 as shown in FIGS. 8 and 16A, as a result, a position of the third frame 31 on the optical axis is determined. Consequently, approach operation of the third lens group 13 to the optical axis is completed. In the retract-initiating position B, the third frame 31 is movable toward the retracted position S.

Meanwhile, the light-shielding strip 31b shields the third frame photo-interrupter 38 shown in FIG. 16A so that it is possible to confirm that the third frame 31 is in the retract-initiating position B. When the third frame female screw member 35 is moved to the retract-initiating position B shown in FIG. 14A, the first abutting portion 35a of the third frame female screw member 35 contacts with a front engaging portion 31d of the stepped portion 31c of the third frame 31. Again, the stepped portion 31c of the third frame 31 has the cam portion 31e and the front engaging portion 31d which forms a planner surface generally perpendicular to the third group main guide shaft 32.

The third frame 31 is constantly biased to move to a direction transverse to the optical axis, that is to say, from the retracted position to the optical axis and a direction along the optical axis, that is to say, from the subject to a retainer plate 81 beside the image plane by the compression torsion spring 37 provided on the third group main-guide shaft 32.

In addition, a portion of the fixed frame 21 to which the compression torsion spring 37 contacts includes a step 37a which is formed as a concave portion for inserting one end of the compression torsion spring 37, as shown in FIG. 14B, to prevent the compression torsion spring from deviating out of a center of the third group main-guide shaft 32 considerably.

Next, when the third frame female screw member 35 is moved to a short focal length/wide angle position such as a wide angle position W shown in FIG. 14A, because the first abutting portion 35a of the third frame female screw member 35 presses the front engaging portion 31d, the third frame 31 is movable to the wide angle position along the optical axis X toward the subject.

Moreover, while the third frame female screw member 35 is disposed between the retract-initiating position B and a telephoto position T, as shown in FIG. 14, because the third frame 31 is constantly pressed along the optical axis toward the image plane by the compression torsion spring 37, all spaces generated among the third group lead screw 34, the third frame female screw member 35 and the retainer plate 81 are directed to the image plane, the third frame 31 can secure a positional accuracy in the direction of the optical axis.

The third frame female screw member 35 is screwed on the third group lead screw 34 disposed substantially in parallel with the optical axis. The third frame female screw member 35 includes a rotation-preventing projection 35b in addition to the first abutting portion 35a, which engages with the above-described front engaging portion 31d or the cam portion 31c of the third frame 31.

The rotation-preventing projection 35b is fitted slidably into a guide groove formed on the cylindrical part of the fixed frame 21 in parallel with the optical axis as a rotation-preventing device for preventing the third frame female screw member 35 from rotating along with the rotation of the third lead screw 34. In other words, the third frame female screw member 35 is moved in the back and forth direction along the optical axis by the rotation of the third lead screw 34, because the third frame female screw member 35 is prevented from rotating by the rotation-preventing projection 35b fitting into the guide groove of the fixed frame 21.

As shown in FIG. 14A in detail, when the third frame female screw member 35 is moved further toward the image plane (left side in the drawing) from the retract-initiating position B shown in FIG. 14A, the third frame female screw member 35 engages with the cam portion 31e of the stepped portion 31c the third lend group-retaining frame 31.

The third frame 31 comes into contact with the retainer plate 81 by a biasing force of the compression torsion spring 37 clockwise, the third frame 31 is rotated counterclockwise against the clockwise biasing force exerted by the compression torsion spring 37, and therefore the third frame 31 can be retracted.

On the other hand, while the third frame female screw member 35 is moved from the telephoto position T through the wide angle position W to the retract-initiating position B by the reverse rotation or counterclockwise rotation of the third group lead screw 34, because the first abutting portion 35a of the third frame female screw member 35 engages with the front engaging portion 31d of the stepped portion 31c of the third frame 31, the third frame 31 moves gradually to direct from the subject to the image plane while maintaining a position on the optical axis limited by the third frame sub-guide shaft 33 by the biasing force toward the optical axis and the biasing force toward the image plane.

Meanwhile, when the third frame female screw member 35 reaches the retract-initiating position B, a base end surface 31f abuts with the retainer plate 81, the third frame female screw member 35 is disposed with an interval from the front engaging portion 31d and contacts with the cam portion 31e of the stepped portion 31c.

While the third frame female screw member 35 moves from the retract-initiating position B to the collapsed position S, the second abutting portion 35c of the third frame female screw member 35 comes into sliding contact with the cam portion 31e of the stepped portion 31c of the third frame 31 and rotates the third frame 31 against the rotational biasing force exerted by the compression torsion spring 37, whereby the third frame 31 moves from the position on the optical axis to the collapsed position S. The collapsed position S of the third frame 31 corresponds to a position at which it is moved toward the image plane by a predetermined pulse count number after the generation of the reference signal of the range from the H to the L generated from the third frame photo-interrupter 38. After the third frame 31 is moved to the collapsed position S, the first lens group 11, the second lens group 12, and the shutter/aperture unit 15 are moved to the collapsible or collapsed position.

In this example, before the third frame 31 is moved to the collapsed position S, a fourth frame 41 for retaining the fourth lens group 14 is first moved to the collapsed position. A first collapsed position of the fourth frame 41 corresponds to a position at which it is moved toward the image plane by a predetermined pulse count number after the generation of a storage reference signal of a range from the H to the L generated by a fourth group reference detector or fourth group photo-interrupter 47. After the fourth frame 41 reaches the first collapsed position, the stored operation of the third frame 31 is initiated.

That is to say, the third frame female screw member 35 moves toward the image plane by a predetermined pulse count number from the generation of the stored reference signal from the H to the L by the third frame photo-interrupter 38 (see FIG. 16A) and the stored operation of the third frame 31 is completed. After the completion of the stored operation of the third frame 31, the first rotary cylinder 22 and structural parts disposed inside the first rotary cylinder 22 and the first liner 23 and so on are stored before contacting with the third frame 31. This results in the storage of the first rotary cylinder 22 and so on without interfering with the third frame 31.

Positions of the first rotary cylinder 22 and so on can be set by a drive pulse count generated by a zoom count detector comprising a pinion gear attached directly to an output shaft of the zooming motor 51 and having an encoder structure and for example, a first and second frames photo-interrupter 51a disposed adjacent the pinion gear, for example.

Meanwhile, although the DC motor is used as the drive source for moving the first rotary cylinder 22 and the drive position of the first rotary cylinder 22 is detected by the detector comprising the encoder and the photo-interrupter, in the above-mentioned example, the similar function can be accomplished by substituting a pulse motor structure for the whole of the above-mentioned structure.

Figure 7:
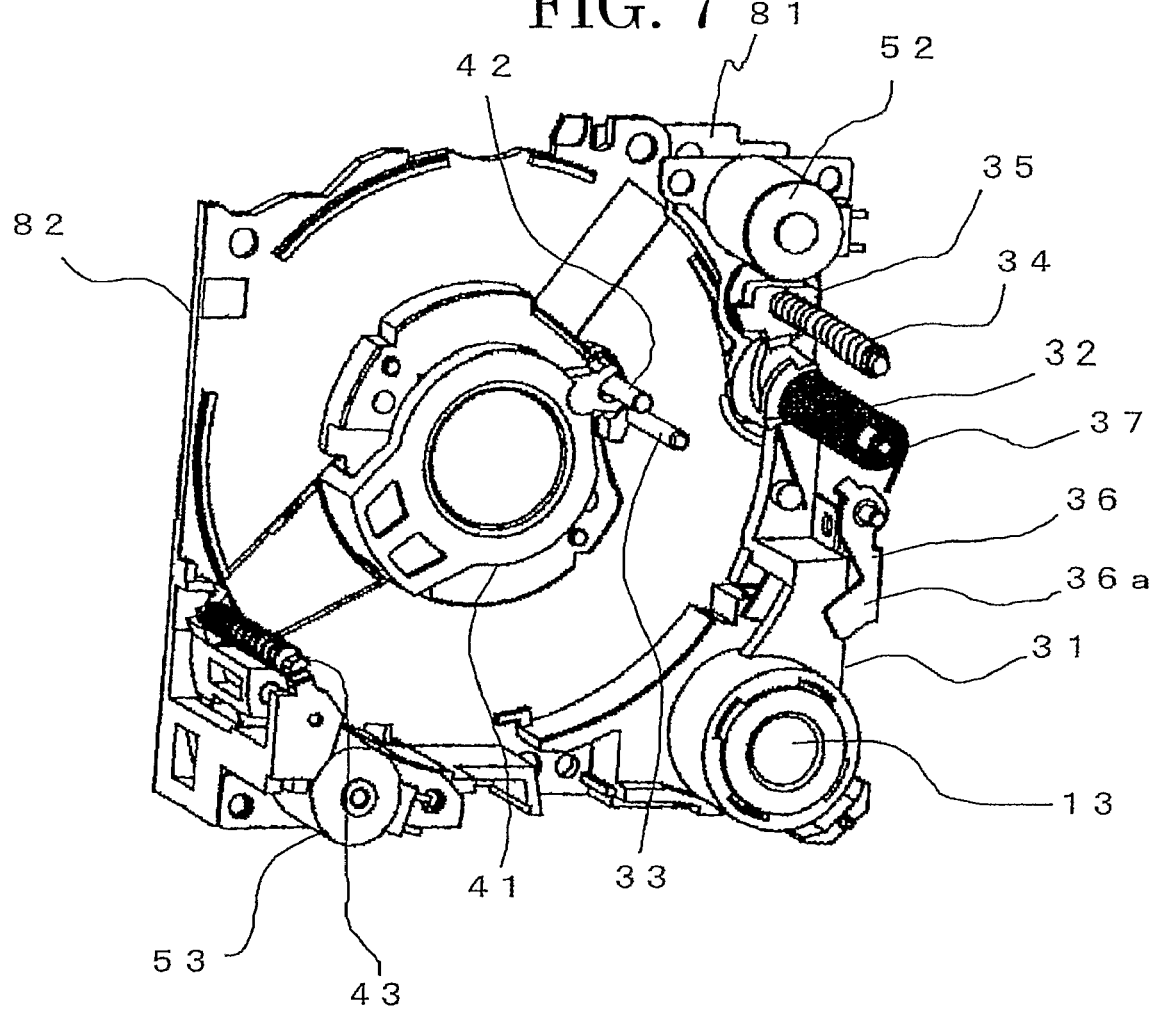
FIG. 7 is a perspective view of a layout of a third frame, an impact preventing member, and a fourth frame in a state in which the lens groups are in a collapsed position, for explaining operations of the third frame which retains the third lens group and the impact preventing member, as viewed from the subject.

To prevent the third frame 31 from collision with the other parts, an impact-preventing member 36 is, as shown in particular in FIGS. 2 and 7, rotatably supported on the fixed frame 21 in the vicinity of the third group main-guide shaft 32 and includes a rotated portion provided at one end of the impact-preventing member and an engaging projection 36a. The impact-preventing member 36 is constantly biased to cause the engaging projection 36a to move toward the optical axis X by a spring or the like.

When the third frame 31 is positioned in the collapsed position, the impact-preventing member 36 is pushed out by a rotating force of the third frame 31 against a biasing force of the spring, and is deviated outside the third frame 31 (see FIG. 2 and FIG. 7, specifically).

When the third frame 31 is rotated and positioned on the optical axis, the impact-preventing member 36 is released from engagement with the third frame 31, and is rotated to cause the engaging projection 36a to be projected toward the optical axis X by the biasing force, thereby causing the engaging projection 36a to project from the inner surface of the fixed frame of the fixed frame 21. At this time, in addition to the first rotary cylinder 22 and the first liner 23, the second rotary cylinder 24, the second liner 25, the cam cylinder 26 and the lineally-moving cylinder 27 are all positioned on the subject side with respect to the projected position of the engaging projection 36a. Therefore, the engaging projection 36a is positioned to project inwardly of an outer peripheral edge of the base portion of each of the first rotary cylinder 22 and the first liner 23 (see FIG. 5, FIG. 6, and FIG. 8, specifically).

With such a structure, even if an operator rotates the first rotary cylinder 22 manually forcibly and moves it to the collapsed position, the impact-preventing member 36 first contacts with the first rotary cylinder 22. Therefore, because the base portion of the first rotary cylinder 22 cannot be moved toward the image plane than the position of the impact-preventing member 36 along the optical axis, the first rotary cylinder 22 is prevented from contacting with the third frame 31. Accordingly, it is possible to accomplish the prevention of breaking, damage or the like of the third frame 31 due to a strength external force.

In addition, the first rotary cylinder 22 can be first moved to the collapsed position after the third frame 31 is moved to the collapsed position correctly. Therefore, in a used or photographing state of the lens barrel, in which the movable cylinders such as the first rotary cylinder 22 and so on are extended, when a great pressure is exerted on a leading end of the lens barrel and so on by a drop of the lens barrel or the like, the engaging projection 36a of the impact-preventing member 36 engages with the first rotary cylinder 22 and the first liner 23, and hence further retraction of the first rotary cylinder 22 and the first liner 23 (as well as the second rotary cylinder 24, the second liner 25, the cam cylinder 26, and the lineally-moving cylinder 27) toward the third lens group 13 is prevented, so that the third frame 31 and the third lens group 13 are prevented from being damaged.

The third group lead screw 34 is rotated in forward and reverse directions by a third frame drive motor 52. The rotation of the third frame drive motor 52 is transmitted to the third group lead screw 34 via gears 71, 72, 73, and 74 arranged in sequence.

Next, a drive structure of the fourth lens group 14 is explained with reference to FIGS. 7, 8, 20A and 20B.

Figure 20A:
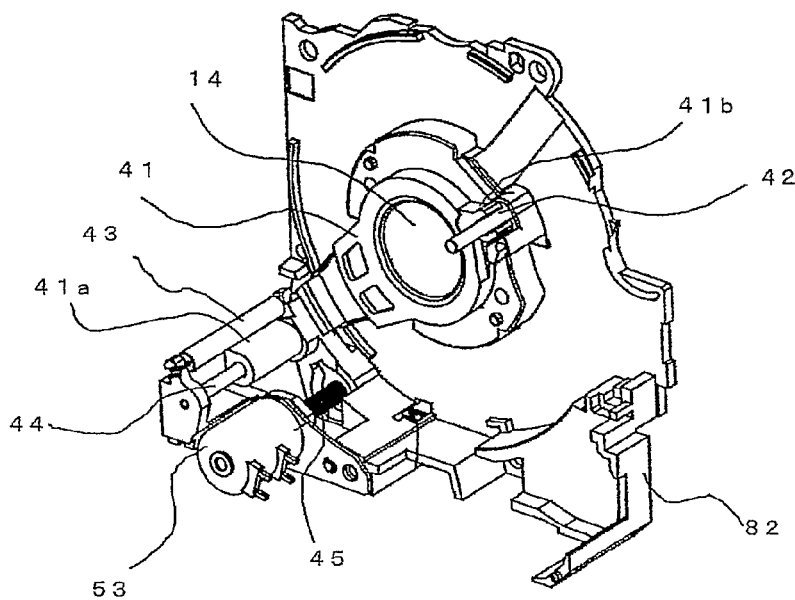
FIG. 20 is an exploded perspective view of a structure of a lens barrel portion in a state that lens groups of a camera according to a third embodiment of the present invention are partly protruded and a structure of a front cover of the camera in a state that a lens barrier is halfway closed, as viewed from the imaging plane.
Figure 20B:
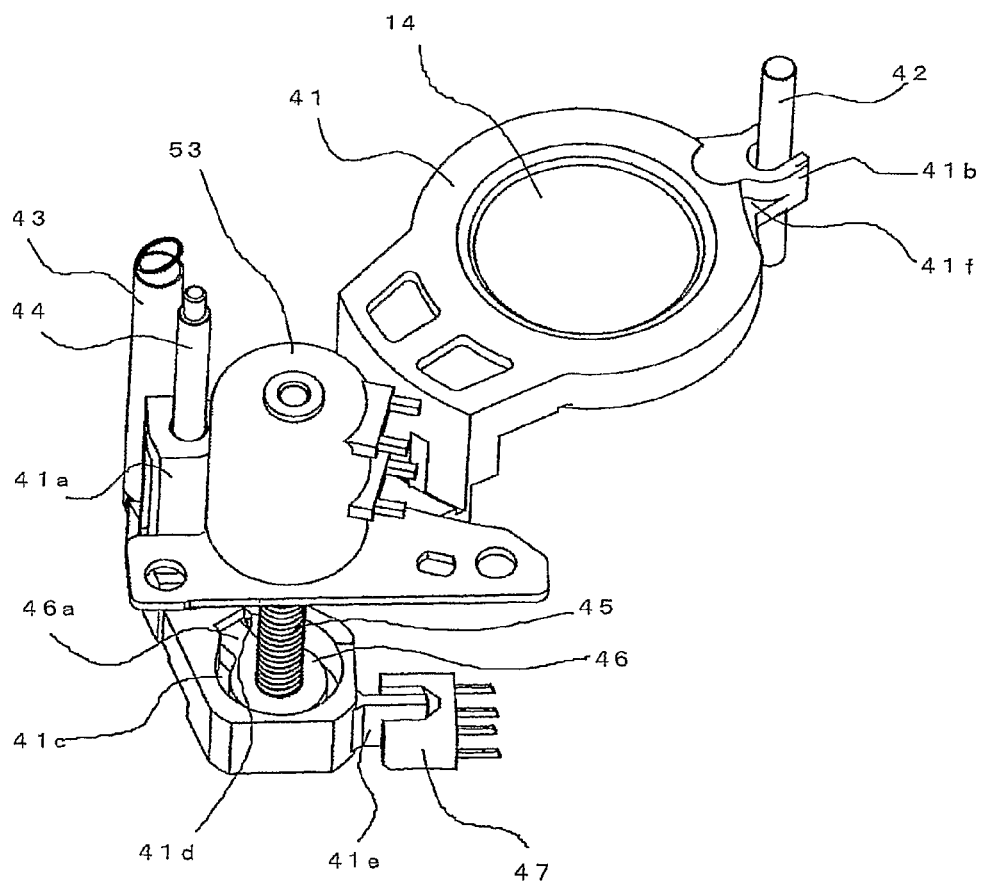

The fourth lens group 14 used as a focusing lens for focusing the lens groups in the illustrated embodiment is retained by the fourth frame 41, as shown in FIGS. 20A and 20B. The fourth frame 41 includes a sleeve portion 41a in which the fourth frame main-guide shaft 44 disposed in parallel with the optical axis and fixed to a lens barrel base 82 is fitted, and a rotation-preventing portion 41b in which the fourth frame sub-guide shaft 42 disposed in parallel with the optical axis and fixed to the lens barrel base 82 is fitted, to limit the rotation of the fourth frame 41. With such a structure, the fourth frame 41 can be moved freely along the fourth frame main-guide shaft 44 or the optical axis. A fourth frame drive motor 53 comprising a stepping motor is used as a drive source for driving the fourth frame 41 in the illustrated embodiment. Provided on an output shaft of the fourth frame drive motor 53 is a fourth frame lead screw 45 which is threaded into a threaded hole provided in a fourth frame female screw member 46.

The fourth frame 41 has an opening for inserting the fourth frame female screw member 46. The opening has an engaging portion 41c for engaging with the fourth frame female screw member 46 in a perpendicular plane to the optical axis in a side of the image plane. The fourth frame 41 is always engaged with the fourth frame female screw member 46 by allowing the fourth frame 41 to bias to the subject by a fourth frame spring 43.

The fourth frame female screw member 46 has a radially projected protrusion 46a. The protrusion 46a is engaged in a bore 41d provided in one side of the opening for inserting the fourth frame female screw member 46 of the fourth frame 41 so that the rotation of the fourth frame female screw member 46 is stopped.

In this way, when the fourth frame drive motor 53 which is the stepping motor is driven, the fourth frame lead screw 45 rotates, the fourth frame female screw member 46 is moved in the forward and reverse directions along an axis of the fourth frame lead screw 45 or the optical axis X. Because the fourth frame 41 engages with the fourth frame female screw member 46, the fourth frame 41 is moved along the optical axis following to the movement of the fourth frame female screw member 46. In this case, although the fourth frame lead screw 45 is formed on the output shaft of the fourth frame drive motor 53, the fourth frame lead screw 45 may be rotated by constituting the fourth frame drive motor 53 and the fourth frame lead screw 45 separately and connecting them through gears or the like.

The fourth frame 41 is provided with a light-shielding piece 41e which shields an optical passage of a fourth group photo-interrupter 47 provided on the lens barrel base 82, the light-shielding piece 41e is capable of light-shielding or passing light through the optical passage of the fourth group photo-interrupter 47 in response to the movement of the fourth frame 41. In this case, the fourth frame 41 can be moved in a predetermined position by recognizing as a reference position a time at which the light-shielding pieces is set from the light-shielding state to the light-passing state, energizing a pulse waveform of any pulse number from the reference position, rotating the fourth frame drive motor 53.

Meanwhile, the fourth frame 41 has a concave portion 41f which is provided in an outer peripheral edge thereof and allows the light-shielding strip 31b of the third frame 31 as the photo-interrupter to move toward the optical axis to avoid the interference with the fourth frame 41, thereby the moved amount of the fourth frame 41 can be increased and a range capable of focusing can be enlarged. Moreover, as described above, there is a clearance between the fourth frame 41 and the fourth frame female screw member 46 in the direction of the optical axis, but the position in the direction of the optical axis of the fourth frame 41 can be controlled accurately by constantly biasing the fourth frame 41 toward the subject by the fourth frame spring 43.

The collapsed position of the first rotary cylinder 22, the first liner 23, the first lens group 11, the second lens group 12, and the shutter/aperture unit 15 is controlled based on the zoom position-reference signal generated by the zoom position detector comprising the photo-reflector and so on disposed in the fixed frame 21. That is to say, it is possible to complete the storing operation by moving them toward the image plane by the predetermined pulse count number of the drive pulse generated by the pinion gear acting as the encoder and the zoom count detector disposed adjacent to the pinion gear after the change of from the H to the L of the zoom position storage reference signal occurs.

In storing, the fourth frame 41 is positioned in the first collapsed position as described above, while, when the first rotary cylinder 22 is moved to the collapsed position, the most distal surface of the first rotary cylinder 22 or the first liner 23 contacts with the fourth frame 41 and presses the fourth frame 41 to move to the second collapsed position finally.

By such an operation, even if variations of the attached position of the fourth group photo-interrupter 47 in the direction of the optical axis occur, the fourth frame 41 can be moved to the collapsed position accurately without requiring a complicated adjustment. Such an operation can be accomplished for the reason that a length of the engaging space formed in the fourth frame 41, in the direction of the optical axis is larger than a thickness of the fourth frame female screw member 46.

The zooming motor 51 for moving the first lens group 11, the second lens group 12, and the shutter/aperture unit 15 is structured by the DC motor as described above in the illustrated embodiment, the third frame drive motor 52 for driving the third lens group 13 and the fourth frame drive motor 53 for driving the fourth lens group 14 are generally configured to use a pulse motor, for example, are driven in conjunction with each other in a software-like manner to achieve an appropriate zooming action performed mainly by the first to the third lens groups 11-13 and an appropriate focusing action performed mainly by the fourth lens group 14, for example.

Here, a drive control system for the lens groups constituting the lens barrel is described in detail.

Figure 21:
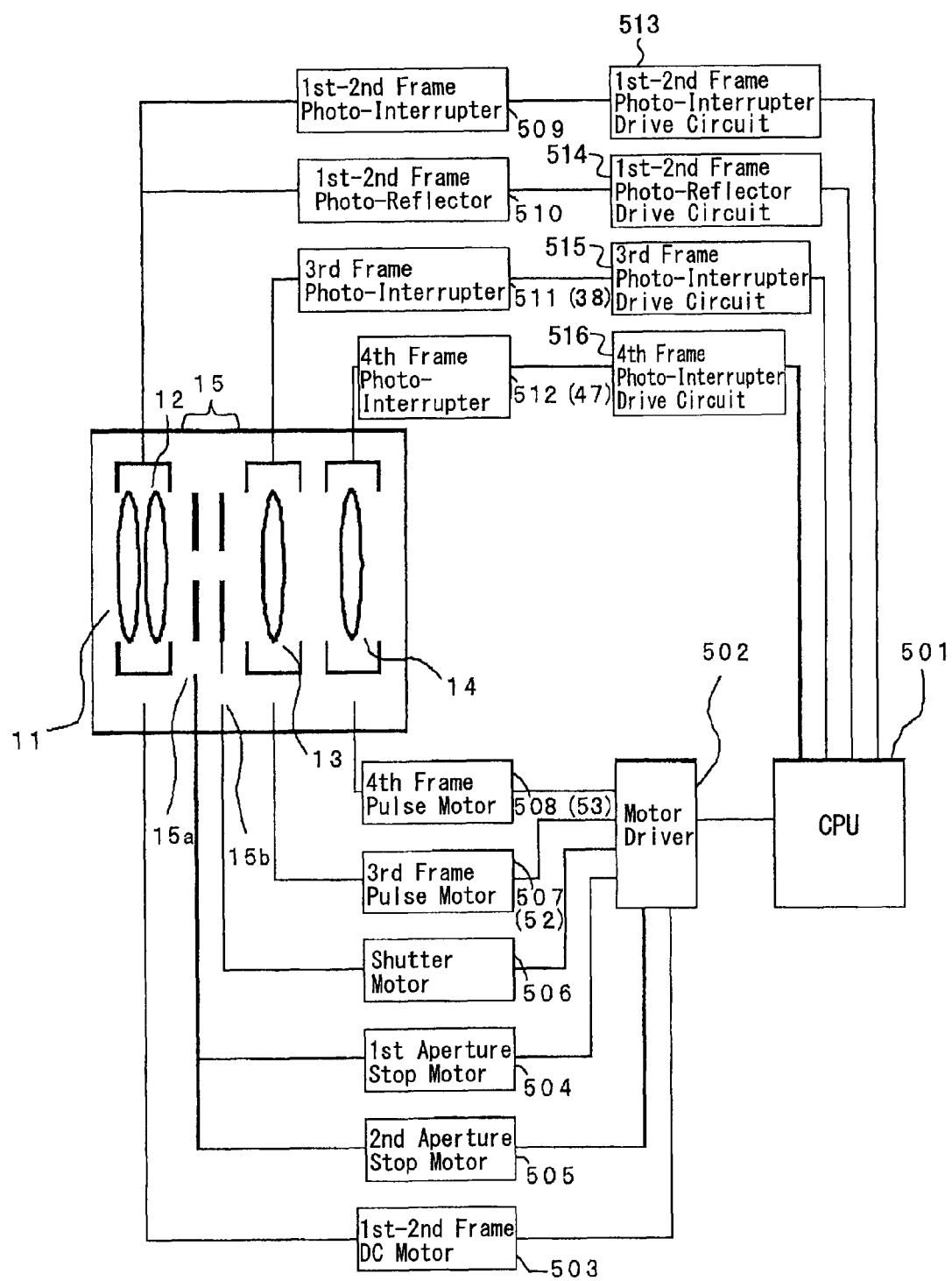
FIG. 21 is an exploded perspective view of the structures in the states shown in FIG. 20 as viewed from the subject.

The drive control system is shown in FIG. 21. The drive control system includes a central processing unit (CPU) 501, a motor driver 502, a first and second frames DC motor 503, a first aperture stop motor 504, a second aperture stop motor 505, a shutter motor 506, a third frame pulse motor 507, a fourth frame pulse motor 508, a first and second frames photo-interrupter 509, a first and second frames photo-reflector 510, a third frame photo-interrupter 511, a fourth frame photo-interrupter 512, a first and second frames photo-interrupter drive circuit 513, a first and second frames photo-reflector drive circuit 514, a third frame photo-interrupter drive circuit 515, and a fourth frame photo-interrupter drive circuit 516.

The CPU gives a command such as an initial setting of the motor driver 502, the selection for a drive motor, the setting of a drive voltage, a direction for driving and so on to the motor driver 502. The motor driver 502 controls the motor system of the first and second frames DC motor 503, the first aperture stop motor 504, the second aperture stop motor 505, the shutter motor 506, the third frame pulse motor 507, the fourth frame pulse motor 508 and so on, in accordance with the command from the CPU 501.

The first and second frames DC motor 503 drives the first and second lens groups 11 and 12. As always, the first and second groups 11 and 12 are driven separately with respect to each other through a cam mechanism in response to the drive of the first and second frames DC motor 503. The first aperture stop motor 504 and the second aperture stop motor 505 are configured to drive an aperture stop of the shutter/aperture unit 15. The shutter motor 506 drives a shutter of the shutter/aperture unit 15. The third frame pulse motor 507 drives the third lens group 13. The fourth frame pulse motor 508 drives the fourth lens group 14.

The CPU 501 supplies a drive electricity to the first and second frames photo-interrupter 509, the first and second frames photo-reflector 510, the third frame photo-interrupter 511, and the fourth frame photo-interrupter 512 as a position-detecting device through the first and second frames photo-interrupter drive circuit 513, the first and second frames photo-reflector drive circuit 514, the third frame photo-interrupter drive circuit 515, and the fourth frame photo-interrupter drive circuit 516. The CPU 501 also acquires a positional information signal detected by the first and second frames photo-interrupter 509, the first and second frames photo-reflector 510, the third frame photo-interrupter 511, and the fourth frame photo-interrupter 512.

The first and second frames photo-interrupter drive circuit 513, the first and second frames photo-reflector drive circuit 514, the third frame photo-interrupter drive circuit 515, and the fourth frame photo-interrupter drive circuit 516 have a function to control suitably a level of a projecting current and an output signal of each of the first and second frames photo-interrupter 509, the first and second frames photo-reflector 510, the third frame photo-interrupter 511, and the fourth frame photo-interrupter 512.

The motor driver 502 receives a command from the CPU 501 and executes the command. The CPU sets a designated voltage to one or more selected motors of the first and second frames DC motor 503, the first aperture stop motor 504, the second aperture stop motor 505, the shutter motor 506, the third frame pulse motor 507, the fourth frame pulse motor 508, and controls them in accordance with a timing of drive command.

Here, a lens barrier 62 for protecting the lens barrel is described as follows.

Figure 3:
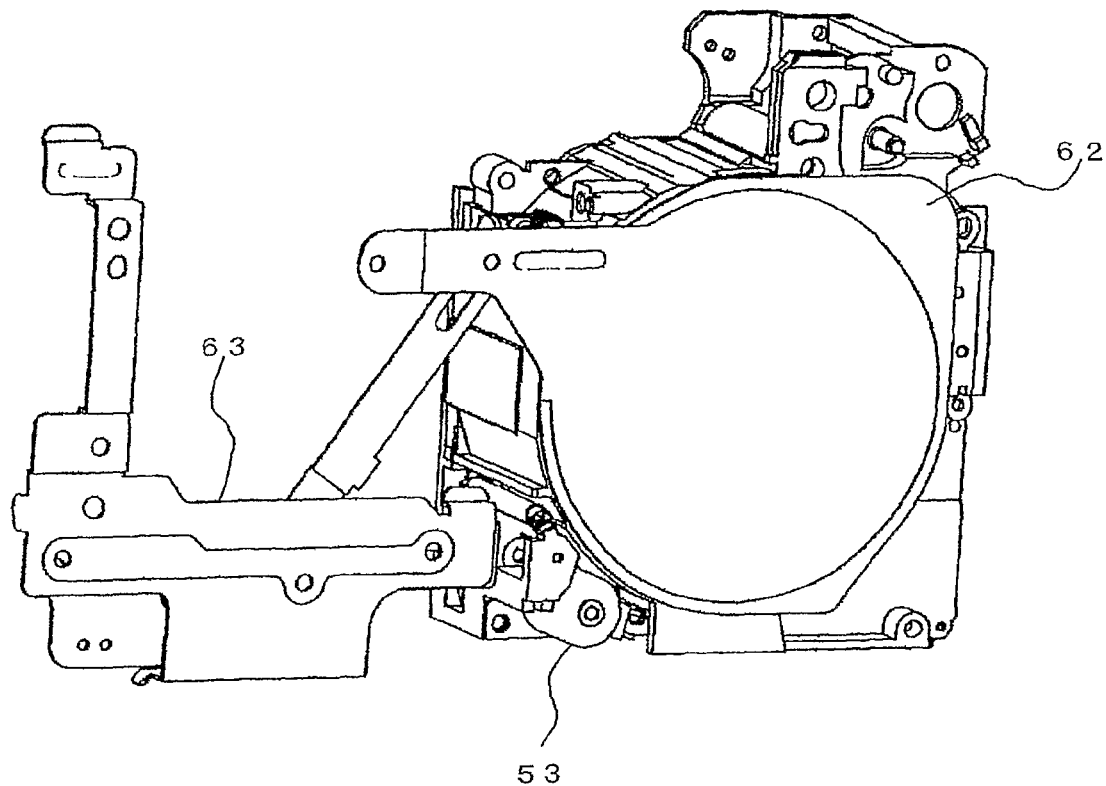
FIG. 3 is a schematic perspective view showing a structure of a main part of the optical system device including the lens barrel in which a lens barrier is closed, as viewed from the subject.
Figure 4:
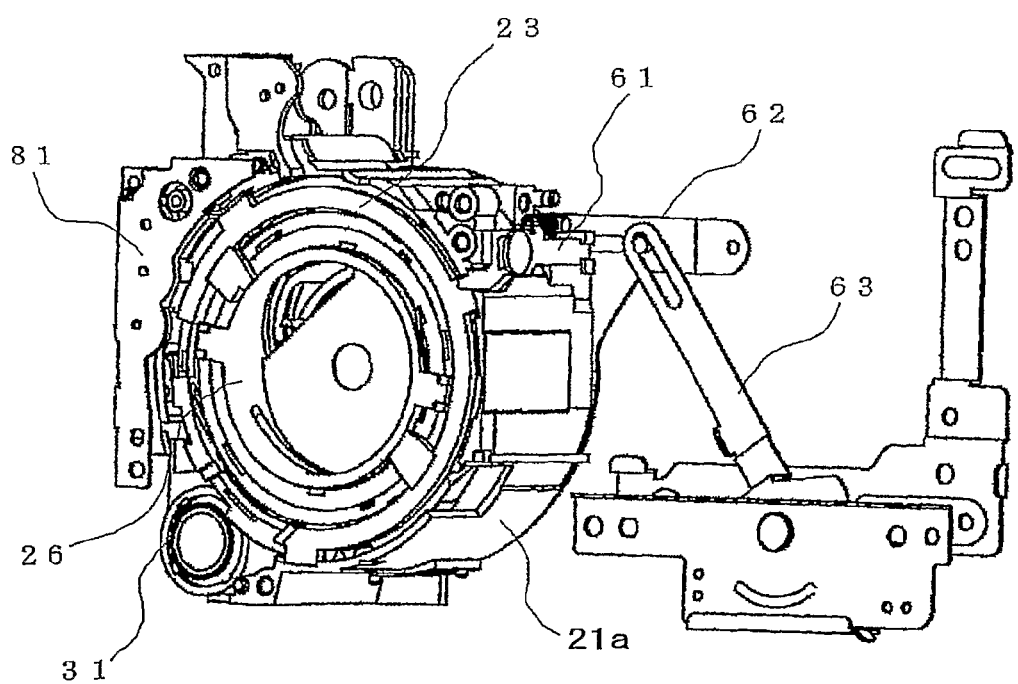
FIG. 4 is a schematic perspective view showing the structure of the main part of the lens barrel shown in FIG. 3, as viewed from the imaging plane.
Figure 5:
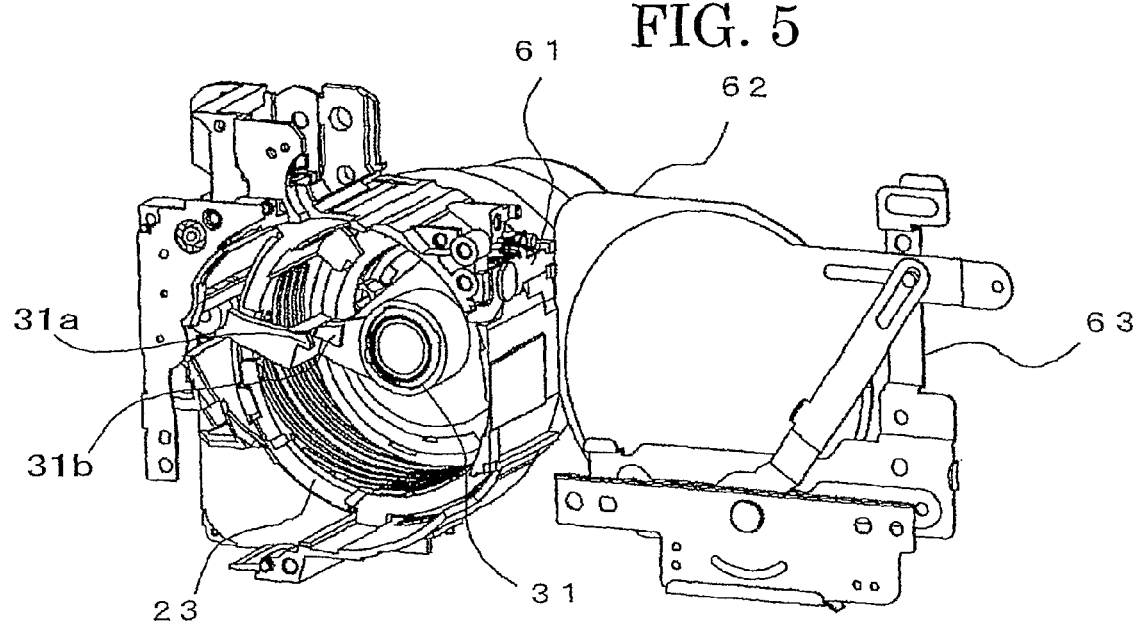
FIG. 5 is a schematic perspective view of the structure of the main part of the lens barrel in a state in which the lens barrier is opened in a photographing state with the lens groups extended, as viewed from the imaging plane.
Figure 6:
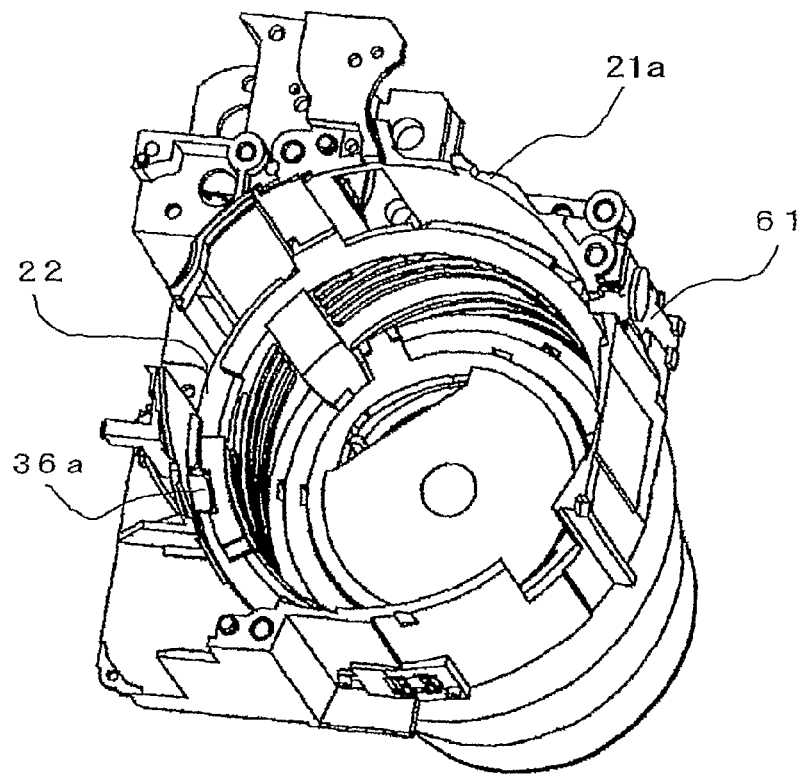
FIG. 6 is a perspective view of the structure of the main part of the lens barrel in the photographing state with the lens groups extended, as viewed from the imaging plane.
Figure 17A:
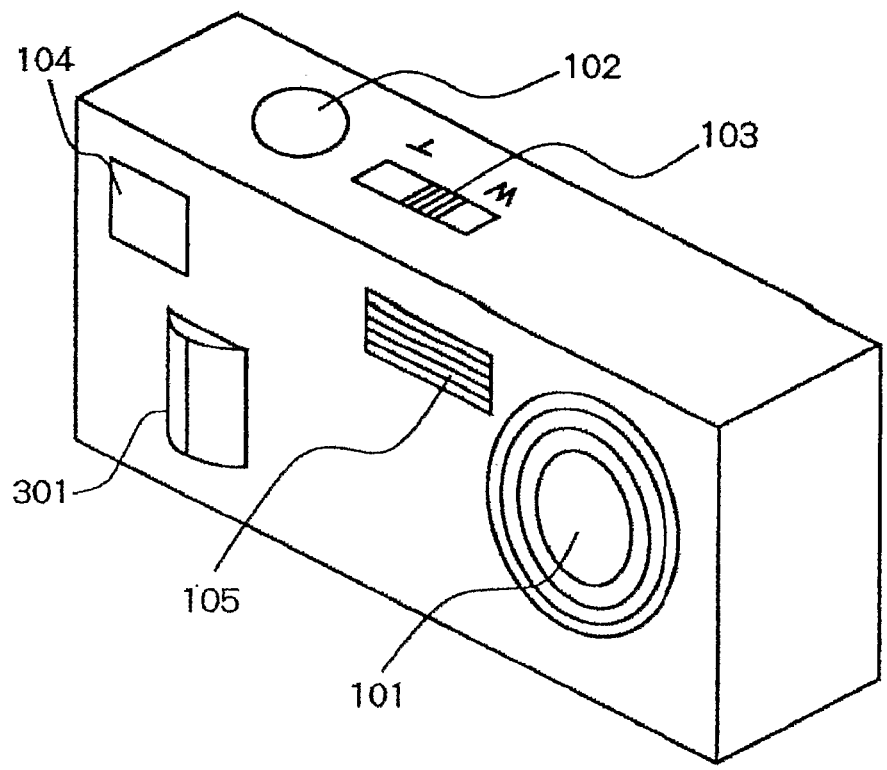

The lens barrier 62 shown in FIG. 3 to FIG. 5 is disposed to cover a side of the first lens group 11 facing the subject, in the stored state, and protects the lens group from contaminations or damages. The lens barrier 62 is moved in back and forth directions transverse to the optical axis by a barrier drive system 63. FIGS. 3 and 4 show a state in which the lens barrier 62 is closed, and FIG. 5 shows a state in which the lens barrier 62 is almost opened. The barrier drive system 63 drives the lens barrier 62 between the closed position (FIGS. 3 and 4) and the opened position (a position farther from the optical axis than the position shown in FIG. 5) through the operation of a barrier-operating element (see a barrier-operating element 301 in FIG. 17A). The barrier drive system 63 has a function to bias the lens barrier 62 in a closing direction at the closed position and in an opening direction at the opened position.

Therefore, when driving the lens barrier 62 in the closed state toward the opening direction, the lens barrier 62 is moved to the opened state semi-automatically when the lens barrier 62 passes a predetermined position. Also, when an attempt is made to close the lens barrier 62 from the opened state, the lens barrier 62 is moved to the closed state semi-automatically when the lens barrier 62 passes a predetermined position. The position in the closed state is not necessarily required to be the same as the predetermined position in the opened state; rather, it is preferable that the lens barrier has a certain degree of hysteresis characteristics in the movement to accomplish a smooth operation of the lens barrier 62.

A barrier control strip 61 is provided on a side of the fixed frame 21 in the direction of opening the lens barrier 62 so as to be capable of sliding in a direction along the optical axis, and is biased toward the subject by a spring or the like as needed. In the stored state, an engaging portion of the barrier control strip 61 which is formed into a bent shape engages with base edge surfaces of the first rotary cylinder 22 and the first liner 23 and is biased toward the image surface against a biasing force of the spring, and hence is not in contact with the lens barrier 62. In the used or photographing state, the lens barrier 62 is completely away from the respective lens groups and retaining frames thereof. In this state, engagement of the engaging portion of the barrier control strip 61 is released, and hence the barrier control strip 61 is biased toward the subject by the biasing force, and then, a barrier-intercepting portion at the distal end enters into a passage of the lens barrier 62.

In this state, when the lens barrier 62 is rapidly operated to move the lens barrel to the collapsed position, there is a possibility that the lens barrier 62 hits against the lens barrel. However, since the barrier-intercepting portion at the distal end of the barrier control strip 61 crosses the passage of the lens barrier 62 to prevent the lens barrier 62 from entering into a moving passage of the lens barrel. When the respective lens groups are stored and the stored state is completed, the base edge surfaces of the first rotary cylinder 22 and the first liner 23 engage with the engaging portion of the barrier control strip 61, which is formed into the bent shape, to energize the engaging portion toward the image surface against the biasing force. Therefore, the lens barrier 62 can be moved to the front portion of the lens barrel, and hence the lens barrier 62 is correctly set to the closed position. In this manner, the interference between the lens barrier 62 and the lens cylinders retaining the lens groups can be effectively prevented.

<Actuation Sequence>

Figure 22:
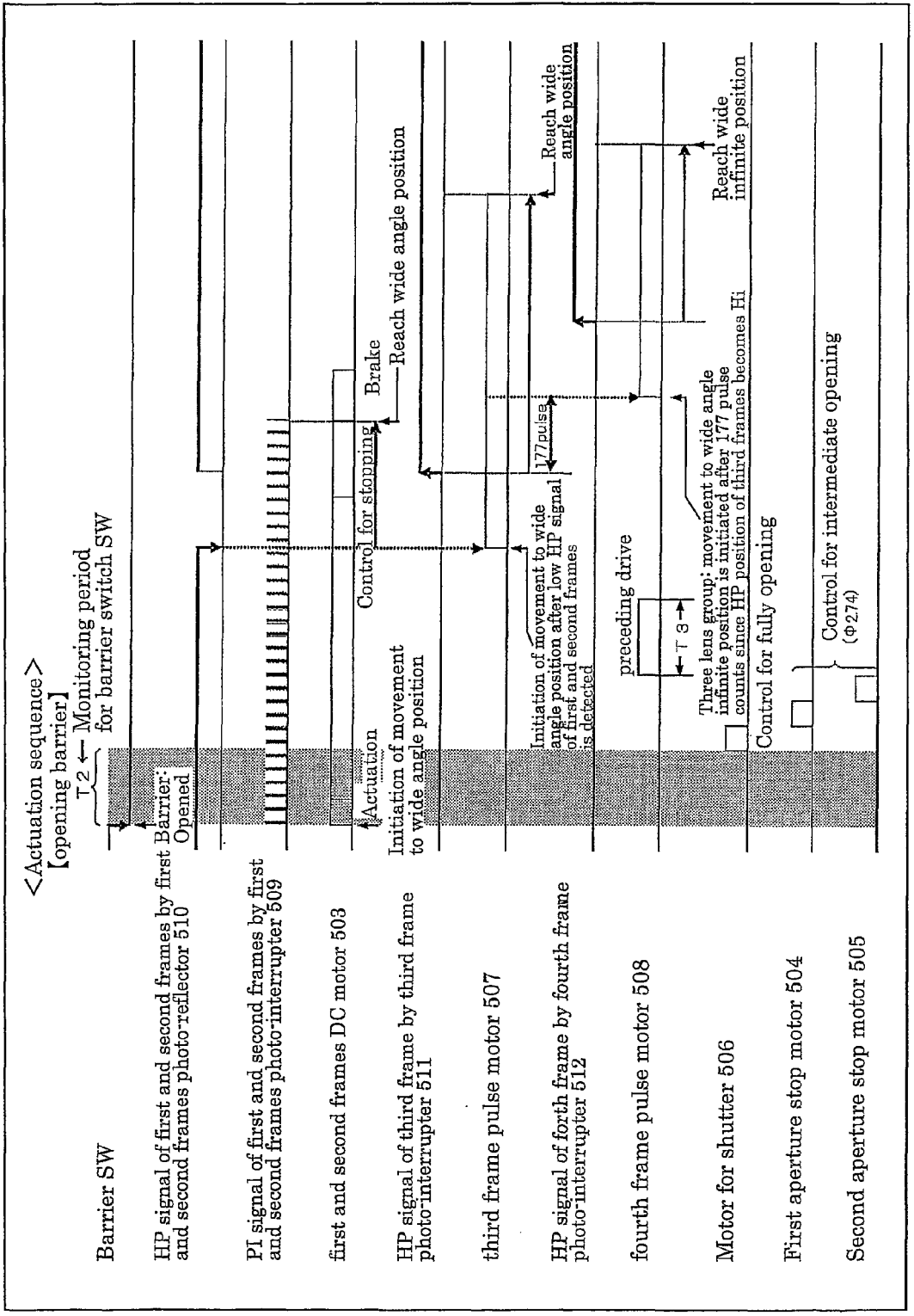
FIG. 22 is a back view of the structure of the front cover of the camera from which an inner cover is removed, as viewed from the imaging plane.

An actuation sequence of the above-mentioned drive control system is explained with reference to FIG. 22.

By opening the lens barrier 62, a barrier switch signal from a barrier switch (not shown) changes from the H to the L and an initial setting of the lens barrel is initiated. Meanwhile, the barrier switch is operated by opening mechanically the lens barrier 62 with an operating lever or the like (not shown), while the lens barrier may be opened by operation of the barrier switch. Executing the initial setting causes the initialization of the motor driver 502 for driving the motor system, and the initialization of the first and second frames photo-interrupter 509, the first and second frames photo-reflector 510, the third frame photo-interrupter 511, and the fourth frame photo-interrupter 512, as the position detecting device for a position through the first and second frames photo-interrupter drive circuit 513, the first and second frames photo-reflector drive circuit 514, the third frame photo-interrupter drive circuit 515, and the fourth frame photo-interrupter drive circuit 516.

In the case that detected results by the first and second frames photo-interrupter 509, the third frame photo-interrupter 511, and the fourth frame photo-interrupter 512 indicate the collapsed position, the first and second frames DC motor 503 is adapted to drive to the wide angle position. A driven amount of the first and second frames DC motor 503 is detected by the first and second frames photo-interrupter 509 for detecting the moving amount of the first and second lens groups. The moving amount is detected by counting edge portions of the pulse signal (PI signal) by the first and second frames photo-interrupter 509.

A period for actuating right after the first and second frames DC motor 503 is actuated is set, during which, the drive voltage is lower than a constant voltage in order to prevent an incoming current by the DC motor. After the actuation period is completed, the drive voltage is increased to a stationary voltage.

A period for monitoring the barrier switch or barrier SW right after the initiation of the actuation of the first and second frames DC motor 503 is set and a state of the barrier switch signal is monitored by the CPU 501. During monitoring period, if the barrier switch signal indicates the opening state of the lens barrier, the shutter is set in the full opening by the shutter motor 50 for driving the shutter. Then, the aperture stop is set in an intermediately restricted state by the first and second aperture stop motors 504 and 505.

In this example, although the aperture stop is set in the intermediately restricted state, it may be set in an opened state or fully opened state.

Next, the fourth lens group 14 is previously driven through the fourth pulse motor 508. By achieving the previous drive of the fourth lens group 14, the total time from the initiation of the drive of the first and second lens groups to the completion of the drive of the final fourth lens group 14 can be reduced. Moreover, it is possible to greaten a torque when driving and prevent the interference of the fourth lens group with the other parts by setting a pulse rate of the fourth frame pulse motor 508 in the previous drive thereof lately than that in the normal driving state.

Meanwhile, the driven amount of the fourth lens group by the fourth frame pulse motor 508 is set so that the third and fourth lens groups interfere with respect to each other.

When the previous drive of the fourth lens group 14 is completed, the waiting for detecting reference position by the first and second frames photo-reflector 510 is set. A place where the reference position signal changes from the H to the L becomes the reference position or HP position of the first and second lens groups 11 and 12. When the reference position or HP position of the first and second lens groups 11 and 12 is detected, positional information of the first and second lens groups 11 and 12 is reset. The movement of the first and second lens groups is controlled by counting the pulse-like signal (PI signal) by the first and second frames photo-interrupter 509 based on the positional information to acquire the moved amount of the first and second lens groups until the wide angle position. The wide angle position is previously set, but it can be changed by storing it in a nonvolatile memory and rewriting it.

A specified pulse period before reaching the wide angle position is a stop controlling period, overrun in reaching the wide angle position can be reduced by lowering the drive voltage in accordance with residual pulse numbers to the wide angle position. If the first and second lens groups reach the wide angle position by counting the PI signal by the first and second frames photo-interrupter 509, a braking control is made in order to stop the first and second lens groups. An amount of overrun during the braking period is counted so that the final position of the first and second lens groups 11 and 12 is decided.

Moreover, when the reference position or HP position of the first and second lens groups 11 and 12 is detected, the drive of the third frame pulse motor 507 in the direction of wide angle position is initiated to control the third lens group 13 with the first and second lens groups 11 and 12. The driving time of the third lens group 13 can be reduced by setting the pulse rate in driving the third group pulse motor highly or rapidly than that in the normal drive.

The third lens group 13 is waited for detecting the reference position by the third frame photo-interrupter 511. A place where the reference position signal or HP signal by the third frame photo-interrupter 511 changes from the L to the H becomes the reference position or HP position of the third lens group 13. When the reference position or HP position is detected, positional information of the third lens group 13 is reset. The third lens group 13 is pulse-driven by the third frame pulse motor 507 based on the positional information to obtain the moved amount of the third lens group 13 to the wide angle position. The wide angle position is previously set, but it can be changed by storing it in a nonvolatile memory such as an EEPROM or the like and rewriting it.

In addition, the final stopping position of the third lens group 13 becomes a position in consideration of overrun of the first and second lens groups 11 and 12. That is to say, because the stopping position of the first and second lens groups 11 and 12 is the wide angle position plus overrun amount, the stopping position of the third lens group 13 is also the wide angle position plus α in consideration of overrun of the first and second lens groups 11 and 12. A value of the α is obtained by a linear calculation depending on pulse numbers between the zooming positions of the first and second lens groups 11 and 12, the overrun amount and a pulse number between the zooming positions of the third lens group 13. The zooming position is one of sections divided into 16 equally between the wide angle position and the telephoto position (between W and T).

If the drive of the first and second lens groups 11 and 12 is completed, the reference position or HP position of the third lens group 13 is detected, and the third lens group 13 is driven more than the specified pulse number, the drive of the fourth frame pulse motor 508 in the direction of a wide angle infinite position is initiated. If the drive of the first and second lens groups 11 and 12 is not completed, or the third lens group 13 is not driven more than the specified pulse from the reference position, the drive of the first and second lens groups 11 and 12 is completed, and a standby state is set until the third lens group 13 is driven more than the specified pulse from the reference position. When the drive of the first and second lens groups 11 and 12 are not completed and the fourth frame pulse motor 508 is driven, the three motors are driven simultaneously to increase current consumption. Therefore, in the example, only the third and fourth lens groups are driven simultaneously. Moreover, when the fourth lens group 14 is driven before the third lens group 13 reaches the position more than the specified pulse number, the interference between the third and fourth lens groups 13 and 14 occurs. Therefore, the drive of the fourth lens group 14 is initiated after the third lens group 13 is driven more than the specified pulse number.

The fourth lens group 14 is waited for detecting the reference position by the fourth frame photo-interrupter 512. In addition, current consumption can be reduced by setting the drive voltage of the fourth frame pulse motor 508 to be lower than that of the normal drive. A place where the reference position signal or HP signal by the fourth frame photo-interrupter 512 changes from the L to the H becomes the reference position or HP position of the fourth lens group 14. When the reference position or HP position of the fourth lens group is detected, positional information of the fourth lens group 14 is reset. The fourth lens group 14 is pulse-driven by the fourth frame pulse motor 508 based on the positional information to obtain the moved amount of the fourth lens group 14 to the wide angle position. The wide angle position is previously set, but it can be changed by storing it in a nonvolatile memory such as an EEPROM or the like and rewriting it.

In the embodiment, as described above and shown in a timing chart of FIG. 22, the current consumption can be reduced by limiting the simultaneously driven motors to two motors, and a time of actuating the motors can be shortened by the optimum drive of the motors.

Figure 23:
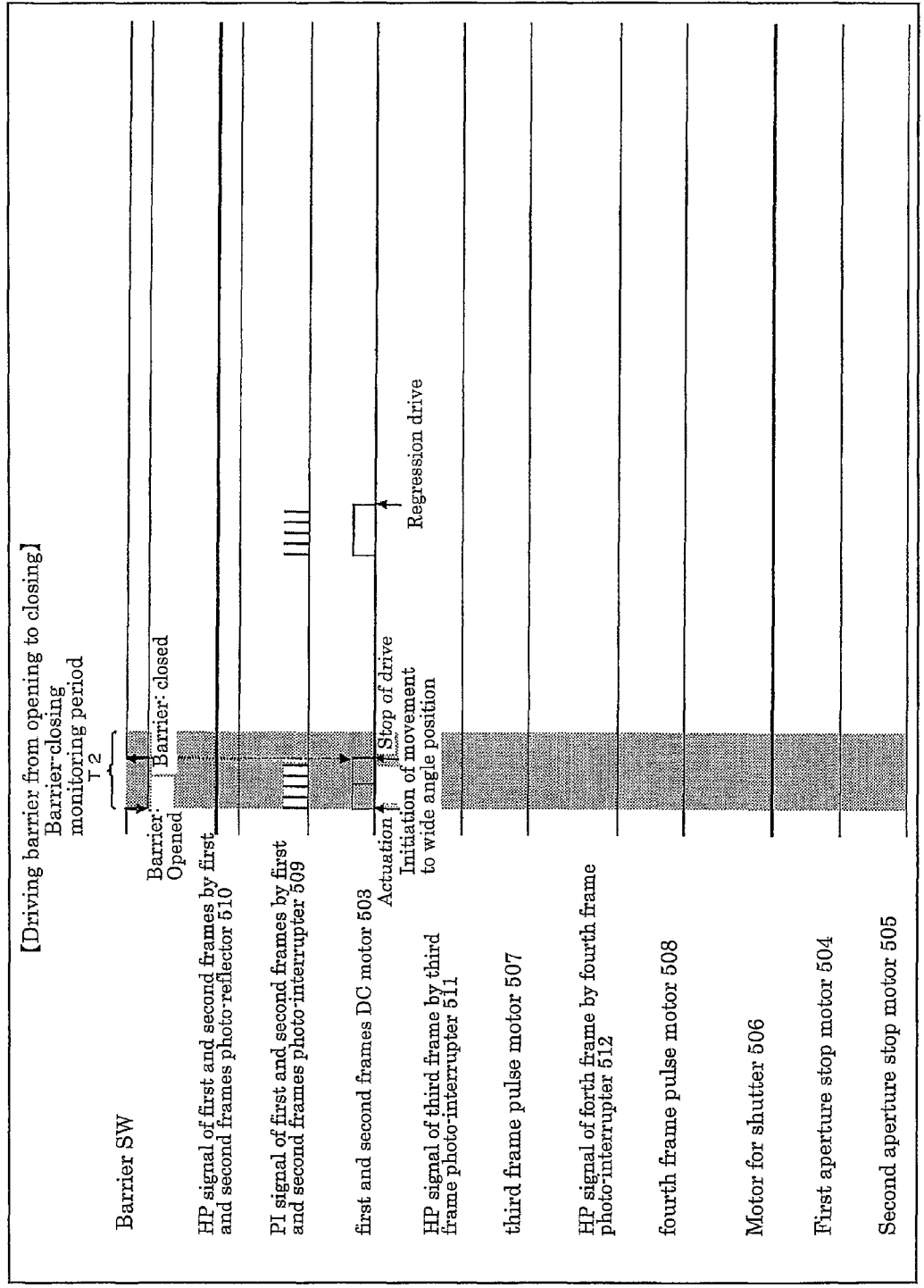
FIG. 23 is a chart showing a state in which the lens barrier is operated from an opened position to a closed position.

Next, a case in which the barrier switch signal is changed in a closed state during a period for monitoring the barrier switch right after the actuation of the first and second frames DC motor 503 is initiated is explained with reference to FIG. 23. If the barrier switch signal is changed from the opened state to the closed state during the period, the drive of the first and second frames DC motor 503 is stopped.

Thereafter, the drive of the first and second frames DC motor 503 is initiated by a moved amount in the direction of the collapsed position or the specified pulse number. In this case, the drive voltage is lower and breaking and damage are prevented from generating even if operating parts of the lens barrier impact with switch first and second lens groups and so on in the end of a collapsed position. By such a control, the first and second lens groups are prevented from interfering with the lens barrier.

[Reset Sequence]

Moreover, if the detected result of the first and second photo-reflector 510 is not the collapsed position (reference position HP, signal L), the detected result of the third frame photo-interrupter 511 is not the collapsed position (reference position HP, signal H), or the detected result of the fourth frame photo-interrupter 512 is not the collapsed position (reference position HP, signal H), the reset sequence drive is executed.

The reset sequence is described referring to FIG. 24 as follows.

<With respect to first and second group HP signal=H, third group HP signal=L, fourth group HP signal=L>

First, as the reset operation of the first and second lens groups 11 and 12, the reference position or HP position of the first and second lens groups is detected, and the first and second lens groups are moved to the wide angle position (first and second groups: Reset). Next, as the storing operation of the fourth lens group 14, the reference position or HP position of the fourth lens group 14 is detected, and the fourth lens group is moved to the collapsed position (fourth group: storage).

Subsequently, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=H, third group HP signal=L, fourth group HP signal=H>

First, as the retiring operation of the first and second lens groups 11 and 12, the first and second lens groups are driven in the direction of the telephoto and pulse-driven by the specified pulse after the lowering of the reference signal is detected (first and groups; retire). Next, as the storing operation of the fourth lens group 14, the reference position or HP position of the fourth lens group 14 is detected, and the fourth lens group is moved to the collapsed position (fourth group: storage). Subsequently, as the reset operation of the first and second lens groups 11 and 12, the reference position or HP position of the first and second lens groups 11 and 12 is detected, and the first and second lens groups are moved to the wide angle position (first and second groups: Reset).

Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=H, third group HP signal=H, fourth group HP signal=L, first and second group HP signal=H, third group HP signal=H, fourth group HP signal=H>

First, as the retiring operation of the first and second lens groups 11 and 12, the first and second lens groups are driven in the direction of the telephoto and pulse-driven by the specified pulse after the lowering of the reference signal is detected (first and groups; retire). Next, as the storing operation of the fourth lens group 14, the reference position or HP position of the fourth lens group 14 is detected, and the fourth lens group is moved to the collapsed position (fourth group: storage). If the reference position or HP position of the fourth lens group 14 can be detected, as the storing operation of the third lens group, the reference position or HP position of the third lens group 13 is detected, and the third lens group is moved to the collapsed position (third group: storage). If the reference position or HP position of the fourth lens group 14 cannot be detected, because it is considered that the fourth lens group is interfered with the third lens group 13, the storing operation of the third lens group 13 is previously carried out (third group: storage).

If the storing operation of the third lens group 13 is completed, and then the storing operation of the fourth lens group 14 is carried out (fourth group: storage). If the HP position is not detected at the time of operating the storage of the third lens group 13, because it is considered that the third lens group 13 is interfered with the fourth lens group 14, as the retiring operation of the third lens group 13, the third lens group 13 is driven by the specified pulse count in the direction of the telephoto (third group: retire). Thereafter, the storing operation (fourth group: storage) of the fourth lens group 14 and the storing operation (third group: storage) of the third lens group 13 are carried out.

Subsequently, as the reset operation of the first and second lens groups 11 and 12, the reference position or HP position of the first and second lens groups 11 and 12 is detected, and the first and second lens groups are moved to the wide angle position (first and second groups: Reset). Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=L, third group HP signal=L, fourth group HP signal=L, first and second group HP signal=L, third group HP signal=L, fourth group HP signal=H>

First, as the storing operation of the fourth lens group 14, the reference position or HP position of the fourth lens group 14 is detected, and the fourth lens group is moved to the collapsed position (fourth group: storage). Next, as the storing operation of the third lens group 13, the reference position or HP position of the third lens group 13 is detected, and the third lens group is moved to the collapsed position (third group: storage). Next, as the reset operation of the first and second lens groups 11 and 12, the reference position or HP position of the first and second lens groups is detected, and the first and second lens groups are moved to the wide angle position (first and second groups: Reset). Subsequently, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=L, third group HP signal=H, fourth group HP signal=L, first and second group HP signal=L, third group HP signal=H, fourth group HP signal=H>

First, as the storing operation of the fourth lens group 14, the reference position or HP position of the fourth lens group 14 is detected, and the fourth lens group is moved to the collapsed position (fourth group: storage). If the reference position or HP position of the fourth lens group 14 can be detected, as the storing operation of the third lens group 13, the reference position or HP position of the third lens group 13 is detected, and the third lens group is moved to the collapsed position (third group: storage).

If the reference position or HP position of the fourth lens group 14 cannot be detected, because it is considered that the fourth lens group is interfered with the third lens group 13, the storing operation of the third lens group 13 is previously carried out (third group: storage). If the storing operation of the third lens group 13 is completed, and then the storing operation of the fourth lens group 14 is carried out (fourth group: storage). If the HP position is not detected at the time of operating the storage of the third lens group 13, because it is considered that the third lens group 13 is interfered with the fourth lens group 14, as the retiring operation of the third lens group 13, the third lens group 13 is driven by the specified pulse count in the direction of the telephoto (third group: retire).

Thereafter, the storing operation (fourth group: storage) of the fourth lens group 14 and the storing operation (third group: storage) of the third lens group 13 are carried out. Subsequently, as the reset operation of the first and second lens groups 11 and 12, the reference position or HP position of the first and second lens groups 11 and 12 is detected, and the first and second lens groups are moved to the wide angle position (first and second groups: Reset). Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP signal of the fourth lens group 14 is detected, and the fourth lens group is moved to the wide angular infinite position (fourth group: Reset).

[Storing Sequence]

The barrier switch signal changes from L to H by closing the lens barrier 62 to initiate the storing operation. Meanwhile, the barrier switch may be operated by mechanically closing the lens barrier 62 by means of an operating lever or the like, or the lens barrier 62 may be closed by operation of the barrier switch.

The shutter of the shutter/aperture stop unit 15 is set in the fully closed state through the full closing control of the shutter by the shutter motor 506. Next, the aperture stop of the shutter/aperture stop unit 15 is set in the intermediately restricted state through the intermediate restricting control of the aperture stop by the first and second aperture stop driving motors 504 and 505. Subsequently, the storing drive of the fourth lens group 14 is achieved through the fourth frame pulse motor 508. The standby for detecting the reference position of the fourth frame pulse motor 508 by the fourth frame photo-interrupter 512 is set after the drive of the fourth frame pulse motor 508 to the collapsed position is initiated.

The fourth frame pulse motor 508 is pulse-driven by a moved amount to the collapsed position from a place where the reference positional signal or HP signal by the fourth frame photo-interrupter 512 changes from H to L to the collapsed position. The moved amount to the collapsed position is previously set, but the moved amount can be changed by storing it in a nonvolatile memory such as an EEPROM or the like and rewriting it.

Next, the drive of storing the third lens group 13 is executed through the third frame pulse motor 507. The third lens group 13 is waited for detecting the reference position by the third frame photo-interrupter 511 by initiating the drive of the third frame pulse motor 507 in the direction of the collapsed position.

The third lens group 13 is pulse-driven by the moved amount to the collapsed position from the place where the reference position signal or HP signal by the third frame photo-interrupter 511 changes from H to L to the collapsed position. Although the moved amount to the collapsed position is set previously, the moved amount can be changed by storing it in a nonvolatile memory such as an EEPROM or the like and rewriting it.

The drive pulse rate of the third frame pulse motor 507 between the reference position and the collapsed position is lower than the drive pulse rate until the reference position. In this way, a smooth pulse drive can be accomplished by changing the pulse rate in accordance with an area in which a torque is necessary.

Next, the drive of storing the first and second lens groups 11 and 12 is executed through the first and second frames DC motor 503. The first and second lens groups are waited for detecting the reference position by the first and second frames photo-reflector 510 by initiating the drive of the first and second frames DC motor 503 in the direction of the collapsed position.

The control for the moved amount of the first and second lens groups 11 and 12 is achieved by counting the pulse-like signal or PI signal by the first and second frames photo-interrupter 509 to acquire the moved amount to the collapsed position from the place where the reference position signal or HP signal by the first and second frames photo-reflector 510 changes from L to H to the collapsed position. Although the moved amount to the collapsed position is set previously, the moved amount can be configured to be changed by storing it in a nonvolatile memory such as an EEPROM or the like and rewriting it.

In the drive for storing the first and second lens groups 11 and 12, if the first and second lens groups 11 and 12 reach the collapsed position by counting the PI signal by the first and second frames photo-interrupter 509 without dropping the voltage of the first and second frames DC motor 503 before stopping it, a breaking control is achieved in order to stop the drive of the first and second lens groups 11 and 12. This is reason the first and second group DC motor is not stopped at the middle of drive due to the dropping of voltage.

[Changing Magnification Sequence]

Figure 26:
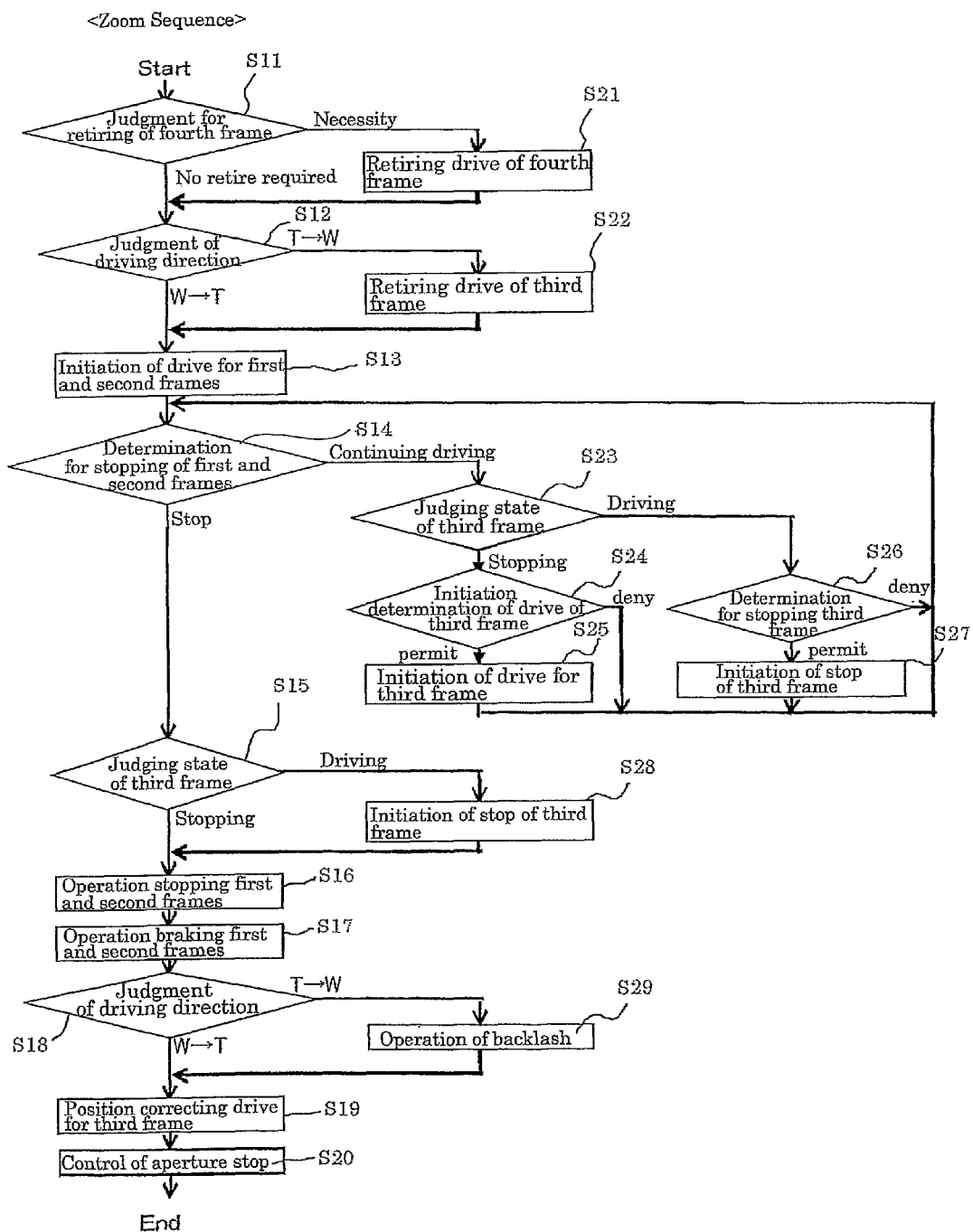
FIG. 26 is a flow chart showing a zoom sequence.

A sequence for operating a changing magnification is described with reference to a flow chart shown in FIG. 26.

When a changing magnification process is initiated by operating a zoom lever, zoom button or the like, whether it is necessary to retire the fourth lens group 14 is determined (step S11). It is determined in the step S11 that the retire process for the fourth lens group is required if the fourth lens group 14 is disposed in a nearer position than a predetermined position in the changing magnification process from the telephoto to the wide angle. Next, a direction of drive of the changing magnification is determined (step S12). If it is the changing magnification from the wide angle to the telephoto, the drive of the first and second lens groups 11 and 12 is initiated by operating the first and second frames DC motor 503 (step S13).

Next, whether the first and second lens groups 11 and 12 are stopped is determined (step S14). It is determined in the step S14 that the first and second lens groups 11 and 12 are stopped in a case satisfying either one of conditions in which if a zoom driving switch operated by changing magnification manipulation through the zoom lever or zoom button or the like becomes off, if the first and second lens groups reach a position in front of a predetermined amount from the telephoto position in the drive from the wide angle to the telephoto, and if the first and second lens groups reach a position in front of a predetermined amount from the wide angle position in the drive from the telephoto to the wide angle.

If the first and second lens groups 11 and 12 are stopped, whether the third lens group 13 is driving is determined (step S15), if the third lens group 13 is stopping, the stopping operation of the first and second lens groups 11 and 12 is executed (step S16) and the breaking operation of the first and second lens groups 11 and 12 is executed (step S17). Subsequently, the driving direction of the changing magnification is determined (step S18), if it is the changing magnification from the wide angle to the telephoto, drive for correcting a position of the third lens group 13 is achieved (step S19), the drive of the aperture stop is executed (step S20), and the process is completed and returned from the step S20 to a process waiting state.

In the step S11, if it is determined that the retire process of the fourth lens group 14 is required, the retire process of the fourth lens group 14 is executed (step S21), and the process is shifted from the step S21 to the step S12. In the step S12, if it is determined the changing magnification driving direction is the changing magnification from the telephoto to the wide angle, the retire process of the third lens group 13 is executed (step S22), the process is shifted from the step S22 to the step S14.

In the step S14, if it is determined that the first and second lens groups 11 and 12 continue to drive without stopping them, whether the third lens group 13 is driving is determined (step S23), if the third lens group 13 is stopping, whether the drive of the third lens group 13 is initiated is determined (step S24).

It is determined in the step S24 that the drive of the third lens group 13 is permitted in a case satisfying one of conditions in which if the first and second lens groups 11 and 12 are driven more than the specified driven amount after the initiation of the drive of the first and second lens groups, if the position of the third lens group 13 is away a predetermined amount or more from the position of the first and second lens groups 11 and 12 when the first and second lens groups pass a predetermined zooming point in the driving state that the third lens group 13 is re-driven from the wide angle to the telephoto, and if the position of the third lens group 13 is approaching a predetermined amount or more to the position of the first and second lens groups 11 and 12 when the first and second lens groups pass a predetermined zooming point in the driving state that the third lens group 13 is re-driven from the telephoto to the wide angle.

In the step S24, if the drive of the third lens group 13 is permitted, the drive of the third lens group is initiated (step S25), the process is returned from the step S25 to the step S14. In the step S24, if the drive of the third lens group 13 is not permitted, the process is returned from the step S24 to the step S14 directly.

In the step S23, if it is determined that the third lens group 13 is driving, whether the drive of the third lens group 13 is stopped is determined (step S26). It is determined in the step S26 that the third lens group 13 is permitted in a case satisfying one of conditions in which if the position of the third lens group 13 approaches a predetermined amount or more to the position of the first and second lens groups 11 and 12 in the drive from the wide angle to the telephoto, and if the position of the third lens group 13 is away a predetermined or more from the position of the first and second lens groups 11 and 12 in the drive from the telephoto to the wide angle.

In the step S26, if the stop of the third lens group 13 is permitted, the stop of the third lens group is initiated (step S27), the process is returned from the step S27 to the step S14. In the step S26, if the stop of the third lens group 13 is not permitted, the process is returned the step S26 to the step S14 directly.

In the step S15, if it is determined that the third lens group 13 is driving, the stop of the third lens group 13 is initiated (step S28), and the process is shifted from the step S28 to the step S16. In the step S18, if it is determined that the changing magnification driving direction is the changing magnification from the telephoto to the wide angle, a backlash operation is executed (step S29), the process is shifted from the step S29 to the step S19.

Next, a changing magnification operation depending on the flow chart is explained every the direction of changing magnification in detail.

[From Wide Angle to Telephoto]

Figure 27:
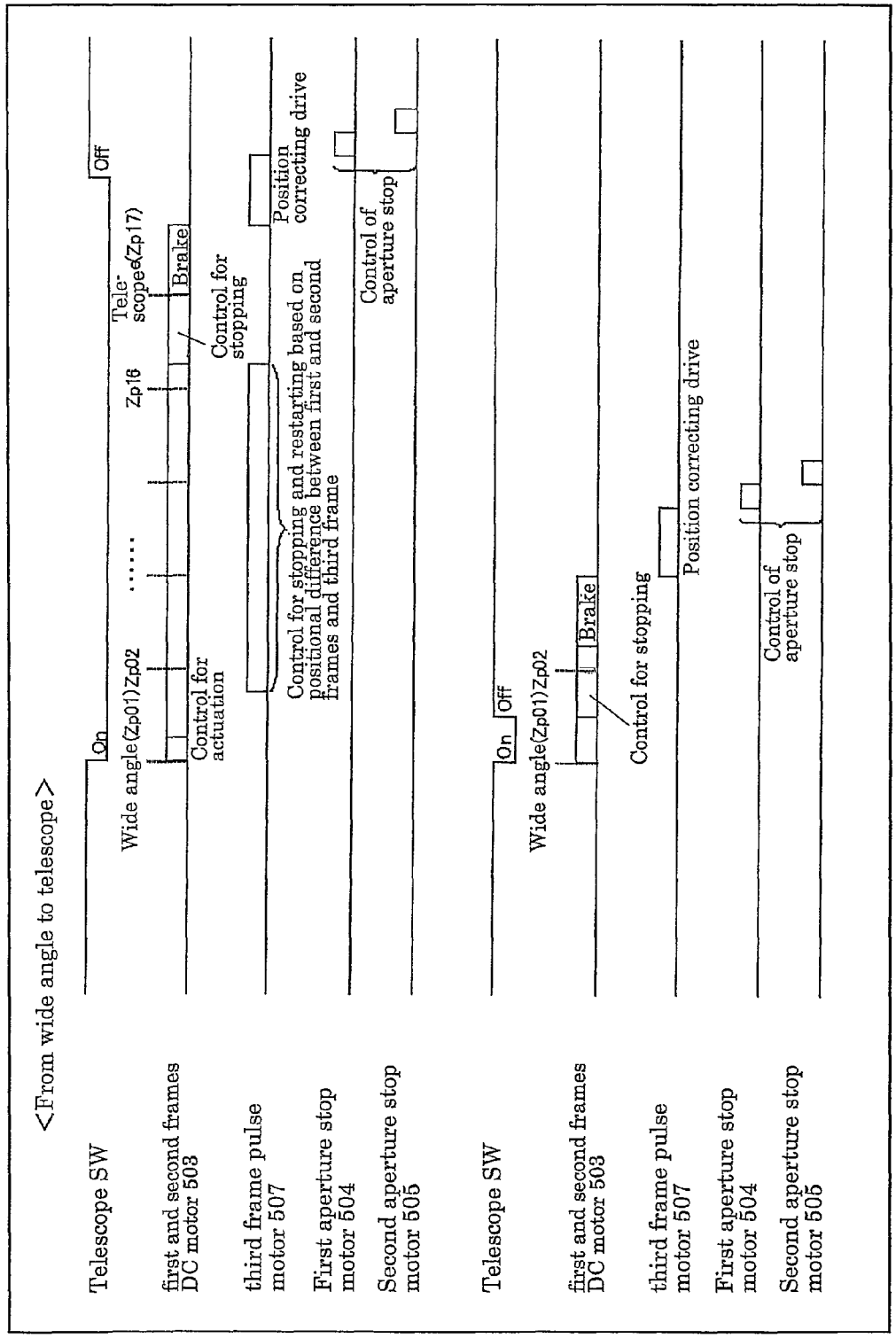
FIG. 27 is a timing chart showing a state from the wide angle to the telephoto.

First, a changing magnification operation from the wide angle to the telephoto is explained referring to the timing chart shown in FIG. 27.

By pressing down the zoom button, which is in a telephoto mode, the telephoto switch signal changes from H to L, a variable sequence to the telephoto direction is initiated. Initially, a retire determination of the fourth lens group 14 is executed (step S11).

As described above, in the retire determination of the fourth lens group 14, the fourth lens group is retired only if the following conditions are satisfied simultaneously (And).

(1) Changing magnification drive from telephoto to the wide angle.

(2) The fourth lens group 14 is positioned in a nearer position to the subject or drawing out position away from a predetermined position or retired threshold position.

However, because the above-mentioned conditions are not satisfied in the drive from the wide angle to the telephoto, the fourth lens group 14 is not retired.

Next, the driving direction, whether the third lens group 13 is retired is determined (step S12). In the case of the changing magnification drive from the wide angle to the telephoto, the retiring drive of the third lens group 13 is not required. The drive of the first and second lens groups 11 and 12 is initiated through the first and second frames DC motor 503 (step S13).

In an actuating period right after the initiation of actuation of the first and second frames DC motor 503, the drive voltage is set to be lower than the stationary voltage in order to prevent an incoming current by the first and second group DC motor. After the actuating period is lapsed, the drive voltage is increased to the stationary voltage. The drive voltage between the wide angle and the telephoto is set to be lower than that between the collapsed position and wide angle position. This is reason a higher speed is required between the stored and wide angle positions, hence a higher voltage is set and a suitable voltage setting is made between the wide angle and the telephoto to allow the first and second frames DC motor 503 to stop at a desired position by operation of the zoom button.

The control of the moved amount of the first and second lens groups 11 and 12 is achieved by counting the pulse-like signal or PI signal by the first and second frames photo-interrupter 509. The zooming points each of which is a control reference position are set in 17 points in which a distance between the wide angle and the telephoto is divided into 16 equally.

Next, whether the first and second lens groups 11 and 12 are stopped is determined (step S14). In the determination for stopping the drive of the first and second lens groups 11 and 12, if either one of the following conditions is satisfied (OR), a stopping process is executed.

(1) A telephoto zooming drive switch operated by the changing magnification operation through the zoom lever or zoom button or the like is turned off, in other words, changed from L to H.

(2) The first and second lens groups reach a position in front of the telephoto position when driving from the wide angle to the telephoto.

During the first and second lens groups 11 and 12 continue to drive, the determination of driving initiation/driving stop of the third lens group 13 is executed in response to the status (during driving or stopping) of the third lens group 13 (step S23). If the third lens group 13 is stopping, the determination of drive initiation of the third lens group 13 is executed (step S24), if the initiation is permitted, the drive of the third lens group 13 is initiated. In the step S24, the drive of the third lens group 13 is initiated if either one of the following conditions is satisfied.

(1) The first and second lens groups 11 and 12 are driven the specified driven amount or more after the initiation of the drive of the first and second lens groups.

(2) During the third lens group 13 is re-driving in the drive from the wide angle to the telephoto, the position of the third lens group 13 is away by a predetermined amount from the position of the first and second lens groups 11 and 12 when the first and second lens groups 11 and 12 pass a predetermined zooming point.

Moreover, if the third lens group is driving, whether the third lens group 13 is stopped is determined (step S26), if the stop is permitted, the drive of the third lens group 13 is stopped. In the determination whether the third lens group 13 is stopped, the third lens group 13 is stopped if the following condition is satisfied.

The position of the third lens group 13 is positioned close than the predetermine amount to the position of the first and second lens groups 11 and 12 in the drive from the wide angle to the telephoto.

That is to say, the first and second lens group 11 and 12 are actuated, if the driven amount of the first and second lens groups 11 and 12 becomes the specified pulse or more, the drive of the third lens group 13 is initiated. During simultaneous drive of the first, second and third lens groups, if the position of the third lens group 13 approaches by the predetermined amount to the position of the first and second lens groups 11 and 12, the drive of the third lens group 13 is stopped. Thereafter, the first and second lens groups 11 and 12 are away from the third lens group 13, if they are away from the third lens group 13 by a predetermined amount, the drive of the third lens group 13 is re-started.

The drive and stop of the third lens group 13 are repeated in response to a positional relationship among the first and second lens groups 11 and 12, and the third lens group 13. Thereby, it is possible to achieve the changing magnification drive while maintaining a distance among the first, second and third lens groups 11, 12 and 13.

When actuating these lens groups, the influence of the incoming current can be avoided by initiating the drive of the third lens group 13 after the drive of the specified amount or more is carried out, therefore the current consumption is reduced.

If the telephoto switch signal changes from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, if the third lens group 13 is driving, the stop operation of the third lens group 13 is initiated. The stop of the first and second lens groups 11 and 12 is also initiated. During the stop operation of the first and second lens groups 11 and 12, a lower speed control period is set, and the drive voltage of the first and second frames DC motor 503 is lowered depending on a residual pulse number to a target position.

Thereby, the overrun amount of the first and second lens groups when reaching the target position is decreased. If the first and second lens groups reach the target position by counting the PI signal by the first and second frames photo-interrupter 509, a breaking operation is executed in order to stop the drive of the first and second lens groups 11 and 12. A final position of the first and second lens groups 11 and 12 is decided by further counting the overrun amount during the period of breaking.

After the first and second lens groups 11 and 12 are stopped, a correction drive for the position of the third lens group 13 is executed. This is configured to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups every the zooming point and the positional information of the third lens group 13 every the zooming point. Thereafter, the drive of the aperture stop is achieved to set a position of the aperture stop corresponding to the stopped zooming position of the third lens group 13 (step S20).

[From the Telephoto to the Wide Angle]

Figure 28:
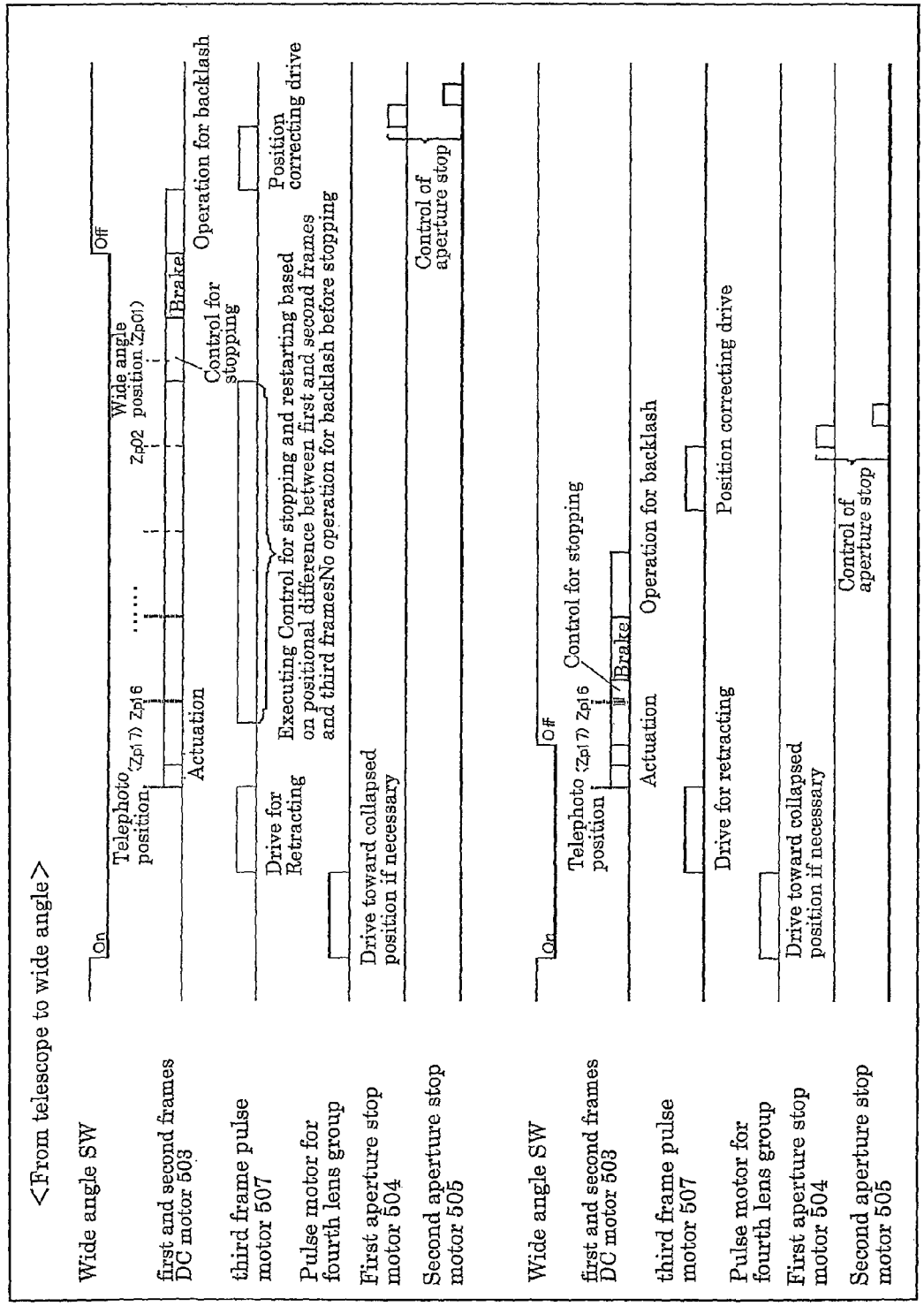
FIG. 28 is a timing chart showing a state from the telephoto to the wide angle.

Next, a changing magnification operation from the telephoto to the wide angle is described with reference to the timing chart shown in FIG. 28.

By pressing down the zoom button, which is in a wide angular mode, the wide angular switch signal changes from H to L, a variable sequence with respect to the wide angular direction is initiated. Initially, a retire determination of the fourth lens group 14 is executed (step S11).

As described above, in the retire determination of the fourth lens group 14, the fourth lens group is retired only if the following conditions are satisfied simultaneously (And).

(1) Changing magnification drive from telephoto to the wide angle.

(2) The fourth lens group 14 is positioned in a closer position to the subject or drawing out position away from a predetermined position or retired threshold position.

If the position of the fourth lens group 14 is in the nearer position than the predetermined position when driving from the telephoto to the wide angle. The retired amount is set to a range in which the third lens group 13 does not interfere with the fourth lens group 14 in the variable operation of the third lens group 13.

Next, the third lens group 13 is retired. In order to prevent the interference of the third lens group with the first and second lens groups 11 and 12 depending on the drive of the first and second lens groups 11 and 12, the third lens group 13 is driven previously by the specified amount. The drive of the first and second lens groups 11 and 12 is then initiated through the first and second frames DC motor 503.

As described above, in the actuating period right after the initiation of actuation of the first and second frames DC motor 503, the drive voltage is set to be lower than the stationary voltage in order to prevent the incoming current by the first and second group DC motor. After the actuating period is lapsed, the drive voltage is increased to the stationary voltage.

The control of the moved amount of the first and second lens groups 11 and 12 is achieved by counting the pulse-like signal or PI signal by the first and second frames photo-interrupter 509. As described above, the zooming points each of which is a control reference position are set in 17 points in which a distance between the wide angle and the telephoto is divided into 16 equally.

In the determination for stopping the drive of the first and second lens groups 11 and 12, if either one of the following conditions is satisfied (OR), the stopping process is executed, as described above.

(1) A telephoto zooming drive switch operated by the changing magnification operation through the zoom lever or zoom button or the like is turned off, in other words, changed from L to H.

(2) The first and second lens groups 11 and 12 reach a position in front of the telephoto position when driving from the telephoto to the wide angle.

During the first and second lens groups 11 and 12 continue to drive, the determination of driving initiation/driving stop of the third lens group 13 is executed in response to the status (during driving or stopping) of the third lens group 13. If the third lens group 13 is stopping, the determination for the initiation of drive of the third lens group 13 is executed, if the initiation is permitted, the drive of the third lens group 13 is initiated. In the determination for initiating the drive of the third lens group 13, the drive of the third lens group 13 is initiated if either one of the following conditions is satisfied.

(1) The first and second lens groups 11 and 12 are driven the specified driven amount or more after the initiation of the drive of the first and second lens groups 11 and 12.

(2) During the third lens group 13 is re-driving in the drive from the telephoto to the wide angle, the position of the third lens group 13 approaches by a predetermined amount to the position of the first and second lens groups 11 and 12 when the first and second lens groups 11 and 12 pass a predetermined zooming point.

Moreover, if the third lens group 13 is driving, the determination for stopping the drive of the third lens group 13 is executed, if the stop is permitted, and the drive of the third lens group 13 is stopped. In the determination whether the third lens group 13 is stopped, the third lens group 13 is stopped if the following condition is satisfied.

The position of the third lens group 13 is away the predetermine amount or more from the position of the first and second lens groups 11 and 12 in the drive from the telephoto to the wide angle.

That is to say, the first and second lens group 11 and 12 are actuated, if the driven amount of the first and second lens groups 11 and 12 becomes the specified amount or more, the drive of the third lens group 13 is initiated. During simultaneous drive of the first, second and third lens groups 11, 12 and 13, if the, position of the third lens group 13 is away the predetermined amount from the position of the first and second lens groups 11 and 12, the drive of the third lens group 13 is stopped. Thereafter, the first and second lens groups 11 and 12 approach to the third lens group 13, if they approach to the third lens group 13 the specified amount or more, the drive of the third lens group 13 is re-started.

The drive and stop of the third lens group 13 are repeated in response to a positional relationship among the first and second lens groups 11 and 12, and the third lens group 13. Thereby, it is possible to achieve the changing magnification drive while maintaining a distance among the first, second and third lens groups 11, 12, and 13.

In actuating these lens groups, the influence of the incoming current of the first and second frames DC motor 503 can be avoided by initiating the drive of the third lens group 13 after the specified pulse or more is counted, therefore the current consumption is reduced.

When the third lens group 13 is driven to the wide angular direction, during the drive of the first and second lens groups 11 and 12, basically a control for eliminating a backlash in the movement of the third lens group 13 is required when it is stopped, but the control is not carried out during the changing magnification operation to accomplish a smooth movement of the third lens group.

If the wide angular switch signal changes from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, if the third lens group 13 is driving, the stop operation of the third lens group 13 is initiated. The stop of the first and second lens groups 11 and 12 is also initiated. During the stop operation of the first and second lens groups 11 and 12, a lower speed control period is set, and the drive voltage of the first and second frames DC motor 503 is lowered depending on a residual pulse number to a target position.

Thereby, the overrun amount of the first and second lens groups when reaching the target position is decreased. If the first and second lens groups reach the target position by counting the PI signal by the first and second frames photo-interrupter 509, a breaking operation is executed in order to stop the drive of the first and second lens groups 11 and 12. A final position of the first and second lens groups 11 and 12 is decided by further counting the overrun amount during the period of breaking.

Furthermore, a control for eliminating a backlash of the first and second lens groups 11 and 12 is executed in the movement from the telephoto to the wide angle thereof.

After the first and second lens groups 11 and 12 are stopped, a correction drive for the position of the third lens group 13 is executed. This is configured to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups every the zooming point and the positional information of the third lens group 13 every the zooming point. In the drive in the wide angular direction of the third lens group 13, the control for eliminating the backlash of the third lens group 13 is executed after it is stopped. Thereafter, the drive of the aperture stop is achieved so that the aperture stop is disposed in a position corresponding to the stopped zooming position of the third lens group 13.

In this example, the drive voltage of the first and second frames DC motor 503 when it is driven in the wide angular direction is set to be higher than that in the telephoto direction in the changing magnification operation between the wide angle and the telephoto. The pulse rate of the third frame pulse motor 507 in the wide angular direction is set to be faster than that in the telephoto direction. An intermittent control for the third lens group 13 is accomplished based on the positional relationship among the first, second, and third lens groups 11, 12, and 13 in order to maintain the distance among the first, second and third lens groups 11, 12, and 13. Therefore, the drive speed of the third lens group 13 is set to be the same as or faster than the drive speed of the first and second lens groups 11 and 12, in the movement in the telephoto direction.

Similarly, the drive speed of the third lens group 13 is set to be the same as or faster than the drive speed of the first and second lens groups 11 and 12, in the movement in the wide angular direction. With such a structure, the third lens group 13 is driven so that the third lens group 13 is not away a predetermined amount or more from the first and second lens groups 11 and 12 in the movement in the telephoto direction, and does not contact with the first and second lens groups 11 and 12 in the movement in the wide angular direction.

Moreover, although the driving re-start timing of the third lens group 13 is set at the time of passing the predetermined zooming point in this example, the timing may be set every the time of detecting the pulse-like signal or PI signal by the first and second frames photo-interrupter 509 generating in driving the first and second lens groups 11 and 12, or every a predetermined count number of the PI signal.

Thereby, it is possible to accomplish a further fine intermittent control of the third lens group 13 and improve accuracy of the distance among the first, second and third lens groups.

In the above-mentioned embodiments, the structure in which the third lens group 13 can be retracted out the lens cylinder unit transverse to the optical axis X has been described. In this structure, the retracted third lens group has the minimum outer diameter. When the third lens group having the minimum outer diameter is retracted, a projective size of the lens barrel in which the third lens group is retracted can be minimized efficiently, and the thickness of the lens barrel can be reduced.

Moreover, when the retracted lens is extended out of the fixed frame, a size of the device (lead screw and so on) for driving the retired lens group or the third lens group is minimized by taking a structure such that the retracted lens is not way from the imaging plane possibly.

Furthermore, the lens retaining frame of the third lens group 13 or the third lens group 13 itself is larger than the lens retaining frames of the other lens groups 11, 12, 14 or the other lens groups 11, 12, 14 in length along the optical axis X, in other words, thickness.

When the thickness of the third lens group 13 is larger than that of the other lens groups 11, 12, and 14, consequently, the thickness of the other lens groups decreases, therefore, the thickness of the lens barrel can be reduced when the lens barrel is in the collapsible position.

As a result, the thickness of the lens barrel or a size in the direction of the optical axis of the lens barrel is minimized.

Because the retract lens group or the third lens group 13 is disposed behind and adjacent the shutter having the aperture stop function, the diameter of the lens barrel is less, and the retraction of the third lens group is simplified without considering the interference of the shutter with the lens group unit and separating the position of the shutter from the lens cylinder unit, excessively.

Next, a structure of the plurality of lens groups is explained in further detail.

The first lens group 11 has a positive power, the second lens group 12 has a negative power, the third lens group 13 has a positive power, and the fourth lens group 14 has a positive power. A changing magnification operation is achieved by changing at least one of intervals between the first and second lens groups 11 and 12, between the second and third lens groups 12 and 13, and between the third and fourth lens groups 13 and 14. A focusing operation is achieved by moving the fourth lens group 14 along the optical axis X.

The shutter/aperture unit 15 is disposed between the second lens group 12 and the third lens group 13. In other words, the shutter having the function of the aperture stop is positioned in front of the third lens group 13. The four lens groups are provided in the lens cylinder unit. Because the third lens group having the minimum outer diameter is retracted out of the lens cylinder unit without separating from the image plane excessively, the retraction of the third lens group 13 can be accomplished with the minimum movement and the outer diameter of the lens barrel can be minimized. In addition, the thickness of the lens barrel is decreased by retraction of at least one lens group.

Furthermore, it is possible to provide a compact lens barrel having a high changing magnification ratio, 4 times or more.

Meanwhile, the lens groups may be structured from a first lens group having a positive power, a second lens group having a negative power, and a third lens group having a positive power, and the third lens group may be retracted.

Alternatively, the lens groups may be structured by a first lens group having a negative power, a second lens group having a positive power, and a third lens group having a positive power, and the second lens group or the third lens group may be retracted.

Each of the lens groups may be structured from one or more lenses, and the lens groups herein indicate integral one or more lenses. Therefore, all the lens groups may be structured by one lens, respectively.

Figure 17B:
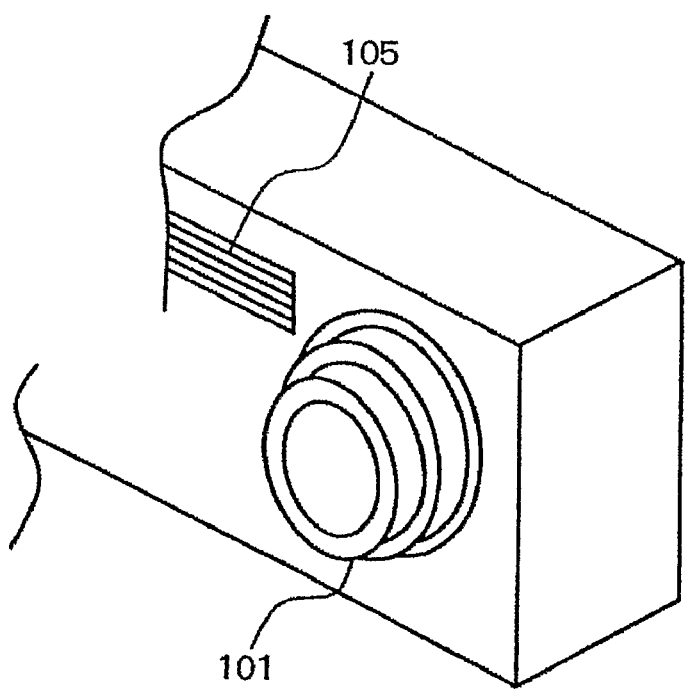
Figure 18:
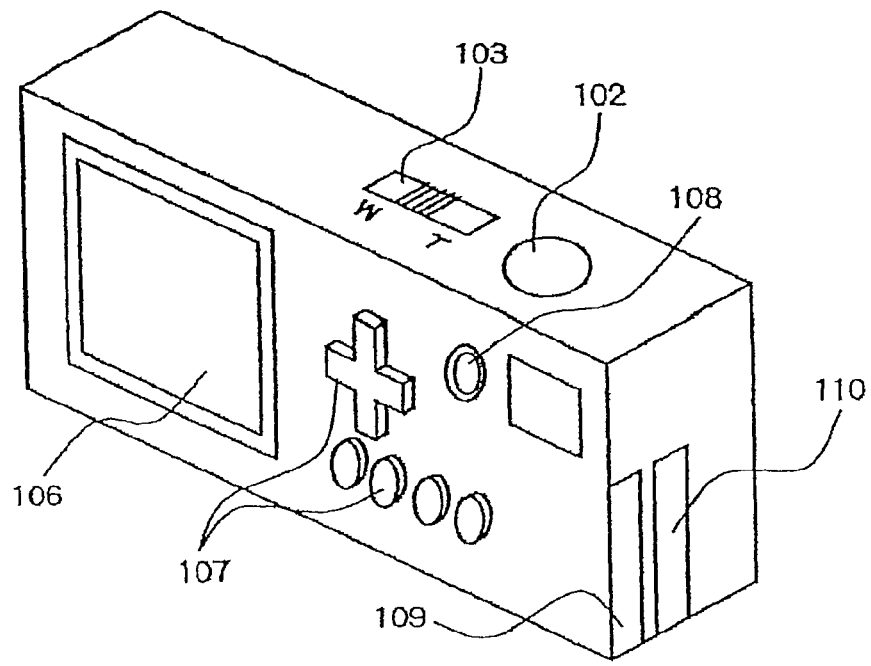
FIG. 18 is a perspective view schematically showing the exterior appearance and structure of the camera of FIGS. 17A and 17B as viewed from a user.
Figure 19:
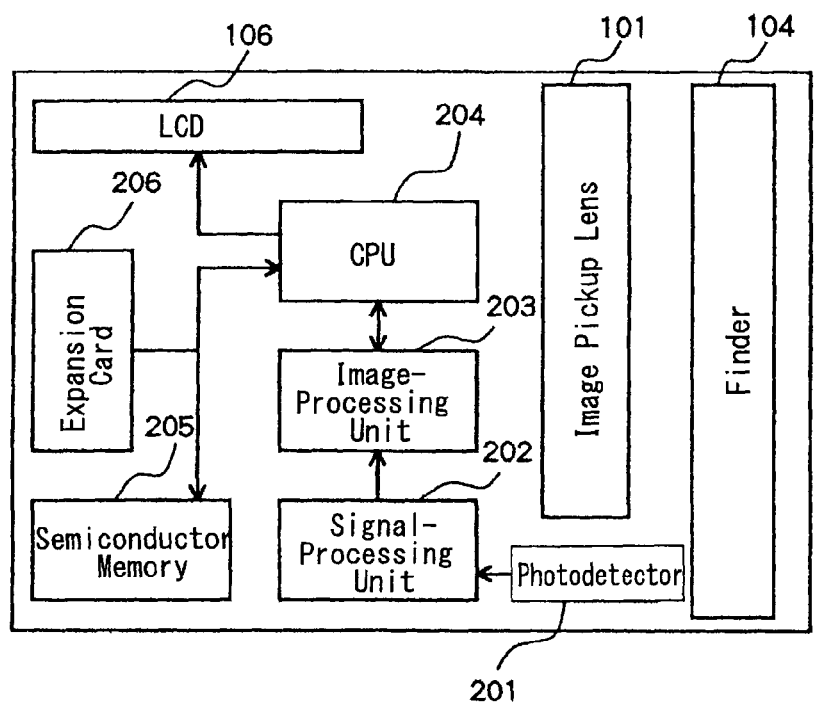
FIG. 19 is a block diagram schematically showing a functional structure of the camera of FIGS. 17A and 17B.

Referring now to FIG. 17 to FIG. 19, a camera including an optical system device having the lens barrel according to the present invention as shown in the first embodiment will be described.

Although the lens barrel is applied to the camera here, the lens barrel is also used to a portable information terminal such as so-called PDA (Personal Data Assistant) or a mobile phone, having a camera function or functional part installed therein.

Many of such portable information terminals have the function and the structure substantially identical to the function and the structure of the camera, although the appearance is slightly different, and hence the optical system device including the lens barrel according to the present invention may be employed in such mobile information terminals. Further, the lens barrel according to the present invention may be applied to an imaging device such as a copying machine, a scanner or the like.

As shown in FIG. 17 and FIG. 18, the camera includes an image pickup lens 101, a shutter button 102, a zoom lever 103, a finder 104, a strobe light 105, a liquid crystal display (=LCD) 106, an operating button 107, a power switch 108, a memory card slot 109, an expansion card slot 110, the barrier-operating element 301 and so on.

Furthermore, as shown in FIG. 19, the camera also includes a photodetector 201, a signal-processing unit 202, an image-processing unit 203, a central processing unit (CPU) 204, a semiconductor memory 205, and an expansion card 206. Although it is not shown clearly, electric power is supplied from a battery as an electric source to the above-mentioned parts to operate the parts.

The photodetector 201 serves as an area sensor such as a CCD (charge coupled device) image pickup element or the like to read an image of a subject to be photographed, that is, of an photographing subject, formed by the image pickup lens 101, which is a photographing optical system. As the image pickup lens 101, the optical system device including the lens barrel according to the present invention as described in the first embodiment is employed.

More specifically, the optical system device includes a plurality lens groups as optical elements and a telescopic cylinder unit retaining the lens groups, which constitute the lens barrel.

The lens barrel has a mechanism of retaining the respective lens groups in the lens cylinder such that the lens groups can be moved in response to the movement of the lens cylinder along the optical axis of the lens groups, similarly to the above-mentioned embodiment. The image pickup lens 101 to be integrated in the camera is generally integrated in the form of this optical system device.

An output from the photodetector 201 is processed by the signal-processing unit 202, which is controlled by the central processing unit 204, and is converted into digital image information. The image information digitized by the signal-processing unit 202 is subjected to a predetermined image processing in the image-processing unit 203 which is also controlled by the central processing unit 204, and then stored in the semiconductor memory 205 such as a non-volatile memory.

In this case, the semiconductor memory 205 may be a memory card inserted in the memory card slot 109, or may be a semiconductor memory integrated in a body of the camera. The liquid crystal display (=LCD) 106 may display the photographing image or may display the image stored in the semiconductor memory 205. An image stored in the semiconductor memory 205 can be transmitted to the outside of the camera via the expansion card 206 inserted in the expansion card slot 110. Meanwhile, the above-mentioned central processing unit (CPU) 501 shown in FIG. 21 to control the drive of the lens groups may be included in the central processing unit 204, otherwise structured by use of other micro-processor connecting with the unit 501.

The image pickup lens 101 is embedded within the camera body into a collapsed or stored state as shown in FIG. 17 A when being transported, and the lens barrier 62 is also into a closed state. When a user operates the barrier-operating element 301 and opens the lens barrier 62, the power is turned on and the lens barrel is moved from the closed position to an opened position and projected from the camera body as shown in FIG. 17 B, so that the photographing state is established. At this time, the image pickup lens 101 within the lens barrel is set so that the respective lens groups of the optical systems constituting a zoom lens are arranged, for example, at a wide angle position.

When the zoom lever 103 is operated, the arrangement of the respective lens groups in the optical system is changed through the movement of the lens groups along the optical axis, therefore, the zoom can be varied to the telephoto position.

Preferably, an optical system of the finder 104 is configured such that the zooming is varied in association with the change of the angle of field of the image pickup lens 101.

In many cases, focusing is achieved by half-pressing operation of the shutter button 102. The focusing with the zoom lens in the lens barrel according to the present invention is achieved mainly by moving the fourth lens group 14. When the shutter button 102 is further pressed to a completely pressed state, the photographing is achieved, and subsequently the processing as described above is performed.

In order to display the image stored in the semiconductor memory 205 on the liquid crystal display (=LCD) 106 or transmit the same to the outside of the camera via the expansion card 206, the operating button 107 is operated in a predetermined manner. The semiconductor memory 205 and the communication card 206 or the like are used by being inserted in a specific or multi-purpose slot such as the memory card slot 109 and the communication car slot 110.

When the image pickup lens 101 is in the stored state, the third lens group 13 is retracted out of the optical axis, and hence is stored in a line with the first lens group 11 and the second lens group 12 in a juxtaposed manner. Therefore, further reduction in thickness of the camera is achieved.

Generally, because a finder mechanism is disposed above of the lens barrel, therefore, certain camera operation is easy. Moreover, if the lens barrel includes a zoom changing magnification mechanism, because the finder mechanism also needs the zoom changing magnification mechanism, it is preferable that a drive source (DC motor, pulse motor or the like) for conducting the zoom changing magnification operation and a transmission mechanism (gear connecting mechanism or the like) for transferring a driving force of the drive source to the lens groups are disposed adjacent the finder mechanism. For example, if the finder mechanism is disposed on upper and left position of the lens barrel, the drive source and the transmission mechanism are disposed adjacent the upper and left position of the lens barrel to use a limited space effectively.

Next, the frame 31 for the retractable lens group or third lens group 13 is retracted, the retaining frame is stored below the lens barrel in consideration of the left space. The space is lower and right position or lower and left position of the lens barrel. In the embodiment, the space is disposed on the lower and right position of the lens barrel to store the retaining frame of the retracted third lens group. The above-mentioned storage part of the fixed lens cylinder is disposed at the position.

The drive source and the transmission mechanism for driving the lens groups are disposed at the lower and left position. As a result, a miniaturized lens barrel can be accomplished with effective use of fourth corners, the upper and left position, the upper and right position, the lower and right position, and the lower and left position of a usual circular lens barrel.

Although the present invention has been described in terms of exemplary embodiments, it is not limited thereto. Rather, the appended claims should be construed broadly to include other variants and embodiments of the invention which may be made by those skilled in the field of this art without departing from the scope and range of equivalents of the invention.

The invention claimed is:

1. A lens barrel, comprising:
   a telescopic cylinder including at least one movable cylinder, said telescopic cylinder being configured to be accommodated in a fixed cylinder;
   at least one movable lens retained in said at least one movable cylinder, an optical axis of said at least one movable lens determining a reference axis of said lens barrel; and
   a retractable lens configured to be retracted in a plane perpendicular to said reference axis from a photographing position on said reference axis to a retracted position off said reference axis,
   wherein, in a photographing state, said retractable lens is adjacent to said at least one movable lens, and said at least one movable lens and said retractable lens are coaxially aligned along said reference axis, and
   a movement of the retractable lens to the reference axis from the retracted position is initiated immediately after the at least one movable cylinder of the at least one movable lens reaching a maximum protruded position.

2. The lens barrel of claim 1, further comprising:
   a movable lens retaining frame configured to retain the at least one movable lens; and
   a retractable lens retaining frame configured to retain the retractable lens.

3. The lens barrel of claim 1, wherein the telescopic cylinder comprises a plurality of movable cylinders.

4. The lens barrel of claim 1,
   wherein the telescopic cylinder includes a first movable cylinder and a second movable cylinder,
   wherein said fixed cylinder comprises:
   a cam groove configured to drive the first movable cylinder, the first movable cylinder being located between the second movable cylinder and said fixed cylinder, in the photographing state,
   wherein said cam groove comprises (i) a first cam groove portion having a first cam shape configured to move substantially linearly the first movable cylinder from a collapsed position to a wide angle position, and (ii) a second cam groove portion having a second cam shape configured to allow said first movable cylinder to rotate about said reference axis between said wide angle position and a telephoto position while restricting forward and backward movements of said first movable cylinder along said reference axis.

5. The lens barrel of claim 4, wherein said fixed cylinder further comprises:
   helicoids formed on an interior wall of said fixed cylinder, said helicoids being configured to provide stability to said first movable cylinder relative to said reference axis when said first movable cylinder moves relative to said fixed cylinder.

6. The lens barrel of claim 5, wherein a length of each of said helicoids is shorter than a length of said first cam groove portion such that said first movable cylinder is configured to rotate about said reference axis after disengaging said helicoids and said first cam groove portion.

7. The lens barrel of claim 4, wherein said first cam groove portion forms a first angle relative to said second cam groove portion, said first cam groove portion forms a second angle relative to said optical axis, and a sum of said first angle and said second angle is 180°.

8. The lens barrel of claim 5, wherein said first cam groove portion and said helicoids are parallel to each other.

9. The lens barrel of claim 4, wherein said fixed cylinder further comprises:

linear grooves configured to linearly move a liner for said movable cylinder.

10. The lens barrel of claim 1, wherein a space is formed in the fixed cylinder when said at least one movable cylinder moves from a collapsed position to said maximum protruded position, and said retractable lens is inserted into said space to align said retractable lens with said at least one movable lens along said reference axis.

11. A camera, comprising the lens barrel according to claim 1.

12. A portable information terminal apparatus, comprising the lens barrel according to claim 1.

13. The lens barrel according to claim 1, further comprising:
   a position detection device which is configured to detect a position of the at least one movable cylinder of the at least one movable lens.

14. The lens barrel according to claim 13, wherein the position detection device is configured to detect that the at least one movable cylinder of the at least one movable lens reaches the maximum protruded position.

15. The lens barrel according to claim 14, wherein after the position detection device detects that the at least one movable cylinder of the at least one movable lens reaches the maximum protruded position, the movement of the retractable lens to the reference axis from the retracted position is initiated.

16. The lens barrel according to claim 1, wherein in a collapsed state, the retractable lens is retracted out of the telescopic cylinder to the retracted position off the reference axis.

17. The lens barrel according to claim 1, wherein the movement of the retractable lens to the reference axis is not initiated until the at least one movable cylinder reaches the maximum protruded position.

18. The lens barrel according to claim 1, wherein after the retractable lens is moved onto the reference axis, the retractable lens moves along the reference axis and is capable of photographing.

19. A control method of a lens barrel, the lens barrel including a telescopic cylinder having at least one movable cylinder, the telescopic cylinder being configured to be accommodated in a fixed cylinder, at least one movable lens retained in the at least one movable cylinder, an optical axis of the at least one movable lens determining a reference axis of said lens barrel, and a retractable lens configured to be retracted in a plane perpendicular to the reference axis from a photographing position on the reference axis to a retracted position off the reference axis, comprising:
   moving the at least one movable cylinder of the at least one movable lens to a maximum protruded position; and
   right after the at least one movable cylinder reaches the maximum protruded position, initiating a movement of the retractable lens to the photographing position on the reference axis from the retracted position off the reference axis.

20. The control method of the lens barrel according to claim 19, further comprising:
   inserting the retractable lens into a space formed by moving the at least one movable cylinder to the maximum protruded position.

21. The control method of the lens barrel according to claim 19, further comprising:
   in a collapsed state, retracting the retractable lens out of the telescopic cylinder.

22. The lens barrel according to claim 1, wherein the at least one movable lens is movable with respect to said at least one movable cylinder along said reference axis.

23. The control method of the lens barrel according to claim 19, further comprising:
   moving the at least one movable lens with respect to said at least one movable cylinder along said reference axis.

* * * * *